(12) United States Patent
Dempski et al.

(10) Patent No.: US 8,209,620 B2
(45) Date of Patent: Jun. 26, 2012

(54) SYSTEM FOR STORAGE AND NAVIGATION OF APPLICATION STATES AND INTERACTIONS

(75) Inventors: Kelly L. Dempski, Evanston, IL (US); Brandon L. Harvey, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 1832 days.

(21) Appl. No.: 11/409,538

(22) Filed: Apr. 21, 2006

(65) Prior Publication Data

US 2007/0179646 A1 Aug. 2, 2007

Related U.S. Application Data

(60) Provisional application No. 60/764,004, filed on Jan. 31, 2006.

(51) Int. Cl.
*G06F 3/048* (2006.01)
*G06F 15/16* (2006.01)
*G06F 3/042* (2006.01)
*G05B 9/02* (2006.01)
*G06K 9/00* (2006.01)

(52) U.S. Cl. .......... 715/764; 709/203; 700/82; 382/103; 345/176

(58) Field of Classification Search .................. 715/764; 383/103; 709/203; 700/82; 382/103; 345/176
See application file for complete search history.

(56) References Cited

U.S. PATENT DOCUMENTS

| | | | |
|---|---|---|---|
| 4,595,990 A | 6/1986 | Garwin et al. | |
| 4,988,981 A | 1/1991 | Zimmerman et al. | |
| 5,298,890 A | 3/1994 | Kanamaru et al. | |
| 5,319,747 A | 6/1994 | Gerrissen et al. | |
| 5,341,155 A | 8/1994 | Elrod et al. | |
| 5,395,242 A | 3/1995 | Slye et al. | |
| 5,408,470 A | 4/1995 | Rothrock et al. | |
| 5,454,075 A | 9/1995 | Kudo | |
| 5,491,743 A | 2/1996 | Shiio et al. | |
| 5,594,469 A | 1/1997 | Freeman et al. | |
| 5,598,183 A | 1/1997 | Robertson et al. | |
| 5,617,312 A | 4/1997 | Iura et al. | |

(Continued)

FOREIGN PATENT DOCUMENTS

EP 1 043 671 A 10/2000

(Continued)

OTHER PUBLICATIONS

Time-Machine Computing: A Time-centric Approach for the Information Environment Jun Rekimoto, Sony Computer Science Laboratories. Inc. published in 1999.*

(Continued)

*Primary Examiner* — Boris Pesin
*Assistant Examiner* — Rinna Yi
(74) *Attorney, Agent, or Firm* — Fish & Richardson P.C.

(57) ABSTRACT

Complex collaboration or decision support applications perform complex design or planning tasks, often with the input of large groups of people over long periods of time. The combination of time and complexity can often obscure past actions, making it difficult to remember the factors that influenced earlier stages in the planning task. This is especially true if the task involves many people and different people work at different times. The application state navigation system provides an application-independent mechanism that allows operators to walk back through the history of the application in order to better understand (or remember) the application actions that were taken in the past and the triggers for those actions.

9 Claims, 23 Drawing Sheets

U.S. PATENT DOCUMENTS

| | | | |
|---|---|---|---|
| 5,686,940 | A | 11/1997 | Kuga |
| 5,712,995 | A | 1/1998 | Cohn |
| 5,757,358 | A | 5/1998 | Osga |
| 5,790,114 | A | 8/1998 | Geaghan et al. |
| 5,793,361 | A | 8/1998 | Kahn et al. |
| 5,803,810 | A | 9/1998 | Norton et al. |
| 5,808,604 | A | 9/1998 | Robin |
| 5,816,820 | A | 10/1998 | Heinz et al. |
| 5,850,211 | A | 12/1998 | Tognazzini |
| 5,870,079 | A | 2/1999 | Hennessy |
| 5,886,683 | A | 3/1999 | Tognazzini et al. |
| 5,956,046 | A | 9/1999 | Kehlet et al. |
| 5,987,557 | A | 11/1999 | Ebrahim |
| 5,991,735 | A | 11/1999 | Gerace |
| 6,002,808 | A | 12/1999 | Freeman |
| 6,034,652 | A | 3/2000 | Freiberger et al. |
| 6,072,494 | A | 6/2000 | Nguyen |
| 6,118,433 | A | 9/2000 | Jenkin et al. |
| 6,147,678 | A | 11/2000 | Kumar et al. |
| 6,204,852 | B1 | 3/2001 | Kumar et al. |
| 6,215,498 | B1 | 4/2001 | Filo et al. |
| 6,283,860 | B1 | 9/2001 | Lyons et al. |
| 6,377,228 | B1 | 4/2002 | Jenkin et al. |
| 6,388,680 | B1 | 5/2002 | Bayrakeri |
| 6,421,042 | B1 | 7/2002 | Omura et al. |
| 6,501,441 | B1 | 12/2002 | Ludtke et al. |
| 6,545,669 | B1 | 4/2003 | Kinawi et al. |
| 6,574,674 | B1 | 6/2003 | May et al. |
| 6,674,447 | B1 | 1/2004 | Chiang et al. |
| 6,680,714 | B2 | 1/2004 | Wilmore |
| 6,760,749 | B1 * | 7/2004 | Dunlap et al. ............... 709/204 |
| 6,774,868 | B1 | 8/2004 | Bowen |
| 6,803,906 | B1 | 10/2004 | Morrison et al. |
| 6,803,912 | B1 | 10/2004 | Mark et al. |
| 6,864,901 | B2 | 3/2005 | Chang et al. |
| 6,888,536 | B2 | 5/2005 | Westerman et al. |
| 6,931,596 | B2 | 8/2005 | Gutta et al. |
| 6,964,022 | B2 | 11/2005 | Snowdon et al. |
| 6,978,281 | B1 | 12/2005 | Kruy et al. |
| 6,983,227 | B1 | 1/2006 | Thalhammer-Reyero |
| 7,006,055 | B2 | 2/2006 | Sukthankar et al. |
| 7,054,963 | B2 | 5/2006 | Betts-LaCroix et al. |
| 7,058,204 | B2 | 6/2006 | Hildreth et al. |
| 7,082,398 | B1 | 7/2006 | Apple et al. |
| 7,103,844 | B2 | 9/2006 | Jones et al. |
| 7,130,885 | B2 | 10/2006 | Chandra et al. |
| 7,176,848 | B1 | 2/2007 | Dai et al. |
| 7,286,120 | B2 | 10/2007 | Van Brocklin et al. |
| 7,373,377 | B2 | 5/2008 | Altieri |
| 7,627,334 | B2 | 12/2009 | Cohen et al. |
| 2001/0019325 | A1 | 9/2001 | Takekawa |
| 2001/0022575 | A1 | 9/2001 | Woflgang |
| 2001/0022579 | A1 | 9/2001 | Hirabayashi |
| 2001/0047357 | A1 * | 11/2001 | Vaithilingam et al. ......... 707/100 |
| 2002/0026441 | A1 | 2/2002 | Kutay et al. |
| 2002/0039111 | A1 | 4/2002 | Gips et al. |
| 2002/0075334 | A1 | 6/2002 | Yfantis |
| 2002/0103625 | A1 | 8/2002 | Card et al. |
| 2002/0113812 | A1 | 8/2002 | Walker et al. |
| 2002/0118880 | A1 | 8/2002 | Liu et al. |
| 2002/0126120 | A1 | 9/2002 | Snowdon et al. |
| 2002/0181773 | A1 | 12/2002 | Higaki et al. |
| 2003/0009578 | A1 | 1/2003 | Apostolopoulos et al. |
| 2003/0015632 | A1 | 1/2003 | Dunn et al. |
| 2003/0063073 | A1 | 4/2003 | Geaghan et al. |
| 2003/0095154 | A1 | 5/2003 | Colmenarez |
| 2003/0174202 | A1 | 9/2003 | Eshkoli et al. |
| 2003/0179156 | A1 | 9/2003 | Willmore |
| 2003/0210258 | A1 | 11/2003 | Williams |
| 2003/0214524 | A1 | 11/2003 | Oka |
| 2003/0225832 | A1 | 12/2003 | Ludwig |
| 2004/0001048 | A1 | 1/2004 | Kraus et al. |
| 2004/0012573 | A1 | 1/2004 | Morrison et al. |
| 2004/0041830 | A1 | 3/2004 | Chiang et al. |
| 2004/0080504 | A1 | 4/2004 | Salesky et al. |
| 2004/0102247 | A1 | 5/2004 | Smoot et al. |
| 2004/0119662 | A1 | 6/2004 | Dempski |
| 2004/0178993 | A1 | 9/2004 | Morrison et al. |
| 2004/0189720 | A1 | 9/2004 | Wilson et al. |
| 2004/0193441 | A1 | 9/2004 | Altieri |
| 2004/0201628 | A1 | 10/2004 | Johanson et al. |
| 2004/0216163 | A1 | 10/2004 | Whitcomb |
| 2004/0240708 | A1 | 12/2004 | Hu et al. |
| 2004/0261026 | A1 | 12/2004 | Corson |
| 2005/0017959 | A1 | 1/2005 | Kraus et al. |
| 2005/0021518 | A1 | 1/2005 | Snowdon et al. |
| 2005/0030255 | A1 | 2/2005 | Chiu et al. |
| 2005/0052427 | A1 | 3/2005 | Wu et al. |
| 2005/0052432 | A1 | 3/2005 | Kraus et al. |
| 2005/0068253 | A1 | 3/2005 | Bartels |
| 2005/0077452 | A1 | 4/2005 | Morrison et al. |
| 2005/0134525 | A1 | 6/2005 | Tanghe et al. |
| 2005/0210419 | A1 | 9/2005 | Kela et al. |
| 2005/0212716 | A1 | 9/2005 | Feigel et al. |
| 2005/0227218 | A1 * | 10/2005 | Mehta et al. .................. 434/350 |
| 2006/0010400 | A1 | 1/2006 | Dehlin et al. |
| 2006/0031786 | A1 | 2/2006 | Hillis et al. |
| 2006/0095360 | A1 | 5/2006 | Apple et al. |
| 2006/0100967 | A1 | 5/2006 | Grimaldi et al. |
| 2006/0101054 | A1 | 5/2006 | Dempski et al. |
| 2006/0101384 | A1 * | 5/2006 | Sim-Tang et al. ............. 717/104 |
| 2006/0179162 | A1 | 8/2006 | Van De Sluis |
| 2007/0179646 | A1 | 8/2007 | Dempski et al. |

FOREIGN PATENT DOCUMENTS

| | | |
|---|---|---|
| EP | 1 591 879 A2 | 11/2005 |
| FR | 2849511 A | 7/2004 |
| JP | 07-104730 | 4/1995 |
| JP | 10-040065 | 2/1998 |
| JP | 2005-181637 | 7/2005 |

OTHER PUBLICATIONS

Matsushita, Nobuyuki, et al., "HoloWall: Designing a Finger, Hand, Body and Object Sensitive Wall," *Proceedings of 10th Annual ACM symposium on User interface software and technology*, Banff, Alberta, Canada, 1997, pp. 209-210.

Ringel, Meredith, et al., "Barehands: Implement-Free Interaction with a Wall-Mounted Display," *CHI'01 extended abstracts on Human factors in computing systems*, Seattle, Washington, 2001, 6 pages.

Wilson, Andrew D., "TouchLight: An Imaging Touch Screen and Display for Gesture-Based Interaction," ICMI'04, Oct. 13-15, 2004, State College, Pennsylvania, 8 pages.

Wilson, Andrew D., "A Demonstration of TouchLight, an Imaging Touch Screen and Display for Gesture-Based Interaction," UIST'04, Oct. 24-27, 2004, Santa Fe, New Mexico, 2 pages.

Han, Jeff, "Multi-Touch Interaction Research", 2006, from http://mrl.nyu.edu/~jhan/ftirtouch/ 2 pages.

Morrison, Gerald D., Smart Technologies, "A Camera-Based Input Device for Large Interactive Displays", IEEE Computer Graphics and Applications, vol. 25, No. 4, pp. 52-57, Jul./Aug. 2005 (2 pages) from http://csdl2.computer.org/persagen/DLAbsToc.jsp?resourcePath=/dl/mags/cg/&toc=comp/mags/cg/2005/04/g4toc.xml&DOI=10.1109/MCG.2005.72.

NESTA (The National Endowment for Science, Technology and the Arts), "Music to the ears of DJs," *scenta*, published Jun. 2, 2005, 2 pages, from http://www.scenta.co.uk/music/features.cfm?cit_id=2620&FAArea1=customWidgets.content_view_1.

Scott, Mark, Public Relations Manager, "Mitsubishi Electric Research Laboratories Named Finalist for the 2003 World Technology Awards," News Release, Mitsubishi Electric Electronics USA, Inc., Cypress, Calif., Jun. 27, 2003, 1 page, from http://www.mitsubishielectric.com/news/2003/6-27-03_MERL_WTA_finalist.html.

E. Gamma, et al., Design Patterns: Elements of Reusable Object-Oriented Software, 1995, Mediator, pp. 273-303, XP002367378.

http://www.gefanucautomation.com/services/press/pressrls.asp?id=50, dated Oct. 1998.

Kelly L. Dempski, "The Use of Broadcast Infrastructures for On-Demand Services" International Conference on Cross Media Service Delivery, May 31, 2003, Santorini, Greece.

Kelly L. Dempski, "Real Time Television Content Platform: Personalized Programming Over Existing Broadcast Infrastructures", Second Workshop on Personalization in Future TV (TV '02) at the Second International Conference on Adaptive Hypermedia and Adaptive Web-based Systems (AH 2002), May 28, 2002, Malaga, Spain.

Kelly L. Dempski, "Context-Sensitive eCommerce", 2000 Conference on Human Factors in Computer Systems (CHI 2000) Extended Abstracts, Apr. 1-6, 2000, The Hague.

Kelly L. Dempski, Brandon Harvey and Beata Korytkowski, "Multi-User Affordances for Rooms with Very Large, Interactive, High Resolution Screens", Computer Human Interaction Virtuality 2005 Apr. 2-7, 2005, Portland.

www.barcocontrolrooms.com, TransForm A, Barco Control Rooms, Belgium, Ref. No. RS99660 Nov. 2005.

Kelly L. Dempski, "Augmented Workspace: The World as your Desktop", First International Symposium on Handheld and Ubiquitous Computing (HUC '99), Sep. 27-29, 1999, Karlsruhe, Germany.

Edy S. Liongosari, Kelly L. Dempski and Kishore S. Swaminathan, "In Search of a New Generation of Knowledge Management Applications", ACM SIGGROUP Bulletin, Jul. 1999.

Adam B. Brody, Kelly L. Dempski, Joseph E. Kaplan, Scott W. Kurth, Edy S. Liongosari and Kishore S. Swaminathan, "Integrating Disparate Knowledge Sources", Second International Conference on the Practical Application of Knowledge Management (PAKeM '99), Apr. 21-23, 1999, London.

Vance Hilderman and Tony Baghai, On the Softer Side, S/W Reliability:Mission-Citical, "Avionics Hardware Must Now Meet Same FAA Requirments as Airborne Software", pp. 32-36, COTS Journal Sep. 2003.

Jupitor Fusion 980 Specifications, Jupiter Systems Inc., www.jupitor.com, 6 pgs., Jupiter Systems, Inc., 2003.

Daniel W. Nagala, Future Recording Requirements and Capabilities in the Oil and Gas Industry, 13pp., International Symposium on Transportation Recorders, May 3-5, 1999.

Daniel W. Nagala, Future Recording Requirements and Capabilities in the Oil and Gas Pipeline Industry, Turing Science Fiction into Practical Applications, 5pp., International Symposium on Transportation Recorders, May 3-5, 1999.

International Search Report for counterpart international application No. PCT/EP2005/011556 (4 pages).

Written Opinion of the International Searching Authority for counterpart international application No. PCT/EP2005/011556 (6 pages).

E. Gamma, et al., Design Patterns: Elements of Reusable Object-Oriented Software, 1995.

United States Patent and Trademark Office Action dated Sep. 28, 2009 for co-pending U.S. Appl. No. 10/981,994.

United States Patent and Trademark Office Action dated Oct. 27, 2008 for co-pending U.S. Appl. No. 10/981,994.

United States Patent and Trademark Office Action dated Apr. 30, 2008 for co-pending U.S. Appl. No. 10/981,994.

United States Patent and Trademark Office Action dated Feb. 8, 2007 for co-pending U.S. Appl. No. 10/981,994.

United States Patent and Trademark Office Action dated May 11, 2009 for co-pending U.S. Appl. No. 10/981,994.

United States Patent and Trademark Office Action dated Jul. 23, 2007 for co-pending U.S. Appl. No. 10/981,994.

United States Patent and Trademark Office Action dated Jan. 15, 2008 for co-pending U.S. Appl. No. 10/981,994.

Paul Dietz and Darren Leigh, DiamondTouch: A Multi-User Touch Technology, *Mitsubishi Electric Research Laboratories*, 2003, 10 pages.

Japan Patent Office Action dated Jul. 26, 2011 for corresponding Japanese Patent Application No. 2007-539514.

* cited by examiner

SYSTEM FOR STORAGE AND NAVIGATION OF APPLICATION STATES AND INTERACTIONS

PRIORITY CLAIM

This application claims the benefit of priority from U.S. Provisional Patent Application No. 60/764,004, filed Jan. 31, 2006, which is incorporated herein by reference.

BACKGROUND OF THE INVENTION

1. Copyright Notice

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. Technical Field

This invention relates to tracking and display of the history of an evolving application. In particular, this invention relates to a system through which an operator may navigate in time through application states, actions taken on the application, and the triggers for those actions to view the application at selected temporal points in the past.

3. Related Art

Groups of people often use complex collaboration and decision support tools, over long periods of time, to perform complex design and planning actions and decisions which drive an application (e.g., a chemical plant process configuration or a complex material distribution chain) to its current state. The combination of time and complexity can often obscure past actions and decisions, making it difficult to remember the factors that influenced earlier stages in the planning. This is especially true if the task involves many people and different people work at different times.

Thus, in the past, applications resulting from the complex design and planning tasks had a relatively opaque history. Any understanding of how an application arrived at its current state was often limited by individual, often inaccurate, memories, hastily taken notes, and poor documentation. Accordingly, it was very difficult to unravel the history of the design and planning steps leading to the current state of the application.

For these and other reasons, substantial challenges existed in providing an understanding of how and why decisions were made, who made the decisions, and how those decisions impacted the current state of the application. These limitations hindered the further development, improvement, and changes to the application as well as attempts to understand how an application arrived at its current state. The limitations also greatly increased the difficulty of effectively and efficiently introducing new people to development or planning roles for the application.

At the same time, the amount of data underlying the history of the application presents significant display, manipulation, and presentation challenges. In particular, distributed data gathering and processing systems allow the collection, storage and manipulation of large amounts of data, including real time data. Real time data is data that is updated and processed at the same rate at which it is received. Real time data may originate in a variety of sources. Examples include sensor networks in systems or environments to be monitored and radio frequency identification tag (RFID) tracking systems for inventory or assets. These and other related technologies have given organizations access to a wealth of real time information about all aspects of the organization's operation. These aspects include, for example, consumer behavior, competitor behavior, employee productivity, supply chain activity, manufacturing, shop floor activity and so on.

For large organizations, this information can be extremely valuable for making decisions or developing insights. In the aggregate, this information may reveal patterns or trends not otherwise immediately apparent. When processed over time, this information may reveal developments that may be used for future prediction. Gathering and managing large amounts of data can provide a new view of system status or operation.

However, the enormous volume of data and the density of inter-connections can make it difficult to easily visualize this information on standard workstations. A conventional workstation is based on personal computer technology and generally includes a processing device and a user interface including, for example, a display screen, a mouse or other input device. While multimedia capabilities can enhance the presentation of information, the small size and limited features of the conventional device make meaningful presentation of the information difficult.

Furthermore, the complexity of the data and the decision making processes necessitate a shared view and collaboration among multiple experts. Even with a large screen and multimedia capabilities, only a few people can see and interact with a conventional workstation simultaneously. If manipulation of a mouse or keyboard is required, only a single person can control the workstation while a limited number of other participants view the process.

One solution to both issues is to give experts access to an immersive environment with which they can view, share, and physically interact with the information. In one example, such an environment is made up of large, high resolution displays, personal digital assistants (PDAs) and three dimensional (3-D) displays, along with alternative interaction modalities such as touch-enabled screens, 3-D mouse, data gloves etc.

Due to constraints with both technology and form factor, such an environment requires a system that can distribute one logical application across multiple computers and display systems that make up the immersive environment. Such a system must handle distribution of both the visual display and the user interactions.

Adequate systems to provide the necessary capabilities have not been available. Currently there is no standard architecture, language or protocol for building applications that span multiple and possibly heterogeneous computers, multiple displays, possibly of different form factors, and multiple interaction modalities. Such applications have to be created from scratch with the application developer managing interaction among multiple computers, multiple displays and multiple interaction modalities. Some commercially available system are typically built using expensive video processors that allow information and graphical data to be displayed on a screen, but not necessarily as one cohesive application. Examples are available from Jupiter.com and are priced in the hundreds of thousands of U.S. dollars A need has long existed for a system which facilitates the understanding, review, and design of complex applications and which addresses the difficulties associated with displaying the potentially extensive volume of data underlying the history of the applications.

SUMMARY

Given this backdrop of complex planning design and planning leading to complex applications, a navigation system provides an application-independent mechanism that allows operators to walk back through the history of the application. The navigation system thereby allows the operator to better understand (or remember) the actions that were taken in the past and the triggers for those actions. Because the actions determine how the application reached any given state at any given time, the navigation system allows the operator to obtain the insight necessary to understand not only the present state of the application, but also the manner in which the application changed over time, and why. In addition, a display image generated by coordinated display devices may provide an extensive graphical interface for conveying the application history, actions taken on the application, contemporaneous environmental data, or any other data useful for understanding the history of the application.

The navigation system may include a display formed from multiple image tiles and a temporal selection interface element. The navigation system stores historical data concerning the application and its development over time. As one example, a historical action database may store action records, optionally distinguished by the operator responsible for the action which influenced the application. The action records may include application action data defining an action taken on the application (e.g., modify a material transportation route) at an action time, an operator identifier which identifies an operator responsible for the action taken, and an application action timestamp representing the action time. As another example, a historical state database may store state records. The state records may include application state data defining an application state of the application at a state time, and an application state timestamp representing the state time. As a third example, a historical environment database may store environment data defining an environmental state of the application at an environment state time an application environment timestamp representing the environment state time.

A processor in the navigation system executes programs stored in a memory of the navigation system. For example, an interface input program may obtain a temporal selection (e.g., "one week ago") from the temporal selection interface element. A temporal index program may initiate database searches based on the temporal selection. As examples, the temporal index program may initiate an action search of the historical action database which results in retrieved application action data, a state search of the historical state database which results in retrieved application state data, and an environment search of the historical environment database which results in retrieved environment data.

An output program may then render an application representation according to the retrieved application state data. Alternatively or additionally, the navigation system may propagate or recreate the application state given the retrieved application action data. The navigation system may also display the application action data for review. In addition, the navigation system may output the retrieved environment data to provide local or remote audiovisual context for the application state.

Regarding the tiled output display for presenting the application history, and by way of introduction only, the presently disclosed embodiments provide a system and method for distributed information processing and interaction. In one general embodiment, application processors respond to one or more software applications to produce outputs such that the respective outputs together form a system output. The individual processor outputs may be a display on a display device, operation of an actuator such as unlocking an electronic lock, or changing information in a database. The processor outputs may be as simple as a change in output data from the processor. Each change or output produced by a processor is a change in the local state of the respective processor as well as a change in the overall system state. Each change in state of an application processor is reported in a state change message to a state server.

The state server operates to synchronize the local states of the respective processors. The state server reflects received state change messages from one application processor to all other application processors in the system. Also, any system inputs are reported to the state server which again reflects the state change to all application processors. In this way, the application processors are maintained in synchronous states. Output changes in one processor that should be reflected in the outputs of other processors are done so, automatically and seamlessly, by reporting the change to the state server and reflecting the change to all other processors.

In a specific embodiment, each application processor drives a display device which produces one or more image tiles of a tiled output display. Each processor uses the state change messages from the state server to update state information for the entire display, even though the processor is responsible for displaying only a designated portion of the display. The assigned, designated portion of the display is the context of the processor. An input device detects user interaction with the display, similar to mouse movements and mouse clicks but, in one embodiment, hand motions in front of the display. Detected user interactions are reported to the state server and information about the user interactions is reflected from the state server to the application processors which produce the image. The image is updated based on the information from the state server.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

DETAILED DESCRIPTION OF THE PREFERRED EMBODIMENTS

Figure 1:
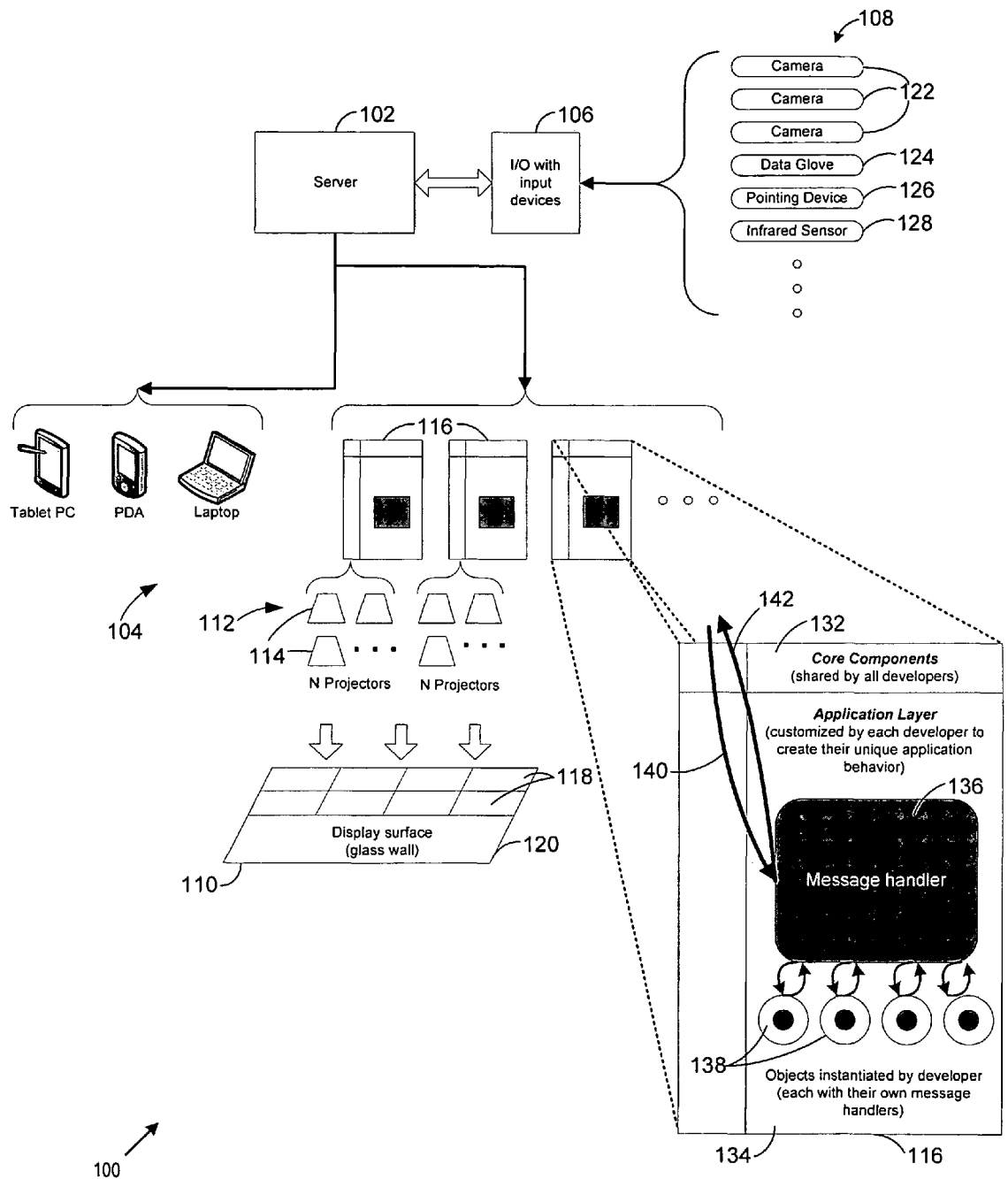
FIG. 1 is a block diagram illustrating architecture of a system for distributed information presentation and interaction.

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of systems and methods consistent with the application state navigation system and method may be stored on, distributed across, or read from other machine-readable media, for example, secondary storage devices such as hard disks, floppy disks, and CD-ROMs; a signal received from a network; or other forms of ROM or RAM either currently known or later developed.

Furthermore, although specific components of the application state navigation system will be described, methods, systems, and articles of manufacture consistent with the application state navigation system may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, and other data structures may be separately stored and managed, may be incorporated into a single memory or database, may be distributed, or may be logically and physically organized in many different ways. Programs may be parts of a single program, separate programs, or distributed across several memories and processors. Furthermore, the programs, or any portion of the programs, may be instead be implemented in hardware.

The present embodiments provide a software architecture and a uniform abstraction layer that allows application developers to create data-intensive and collaborative applications without explicit concern for how the application might be distributed across multiple displays and computers within the immersive environment. This architecture is implemented through high-level primitives that include five mechanisms that: (a) divide an application or set of applications across multiple machines and multiple form factors, (b) provide mechanisms for aligning output portions such as display segments on different computers and/or different output devices, such as projectors, (c) provide means for collecting user interactions from multiple input devices which may be controlled by multiple machines, so that the application has a synchronized view of user interactions, (d) provide a communication/synchronization mechanism to allow multiple data-intensive and collaborative applications to execute and cooperate within a single computing environment, and (e) provide user interface constructs that allow multiple users of the application to interact with each other within the immersive environment.

The software architecture in accordance with these embodiments provides a uniform abstraction layer for constructing data-intensive and collaborative applications for immersive environments. The uniform abstraction layer frees application developers from managing low level details of the environment, thereby dramatically increasing their productivity and application quality. The innovation also allows application developers in developing data-intensive and collaborative applications for immersive environments.

The architecture is built to support applications and the review of application history in a distributed, immersive, multi-user environment; an environment that is not supported by typical desktop operating constructs. Therefore, the architecture is built to shield a developer from the complexities of the environment and allow them to write the end-user applications through a uniform abstraction layer. That layer assumes that any application might reside on more than one physical computer. It therefore provides transparent support for segmenting the application and synchronizing the segments. The developer creates the application as if it were a single process on a single computer. The architecture also assumes that several applications might be cooperating within a single environment or multiple locations. It therefore provides the messaging and synchronization mechanisms needed to maintain the overall environment, even across multiple platforms and modalities. Developers need only to make sure that each different application understands different states. Furthermore, the architecture assumes that there can be several input mechanisms and that one or more of the input mechanisms might allow multiple simultaneous inputs from one or more users. The architecture provides the end applications with a common synchronized view of all inputs. The developer needs only to map those inputs to state changes (based on application rules), which are in turn synchronized by the architecture. Finally, the architecture assumes that some end displays might be composed of multiple tiled projectors. In this case, the architecture supplies the software facilities needed to precisely align and blend the edges of multiple tiles. This may be done by the user at run time, but this complexity is hidden from the application developer. Details for each component are listed below:

Networked Messaging Component: The architecture automatically connects all applications to the centralized server that controls synchronization and messaging. The complexities of networking are hidden from developers and the architecture passes messages directly to the application. As a result, there is no distinction between local interactions (such as from an attached keyboard) and networked interactions (such as from a networked control device). Also, the developer handles messages in a manner that is very similar to a Windows "Message Map", but the architecture handles distributing the results of the message map to all computers. Messages can originate from applications or from dedicated user interface devices such as touch screens or data gloves.

Networked Time Synchronization: The architecture also ensures that all applications and/or application fragments have a common, synchronized time. This is crucial to animation and state management. In addition to the common time data, the architecture also supplies an "interpolator" class that can be used to manage state, animations, and any other time based data. Interpolator objects can be assigned start and end times, start and end values, and interpolation functions that determine how the values change over time. Once created, the interpolators supply time synchronized values to animations and other time sensitive features.

Application Fragmentation: Application developers can write single applications that place and animate objects on a single very large virtual canvas. Host computers each have a small data file that specifies what area of that virtual canvas they control. This is generally determined by the capabilities of the computer and the physical placement the screen. When the application runs on multiple machines, the architecture uses the data file to draw the appropriate portion of the canvas. The previous two features ensure that all fragments are synchronized and present themselves as one logical application.

Application Coordination: In some environments, especially those with different hardware platforms, several individual applications (as opposed to one fragmented application) might need to interact to provide a single working environment. This is also supported by the architecture. The architecture uses the Networked Messaging Component to message environmental state changes to all registered applications. Each application can respond according to its own criteria.

Screen Alignment: The architecture supports the use of tiled projected images to present display output. One inherent problem with tiled projection is that adjacent projectors must be carefully aligned and edge-blended to create a single contiguous display space. The architecture uses information in the data file mentioned above to determine whether or not the image must be aligned and how the alignment must be done. If alignment is necessary, the architecture loads a file with user-supplied alignment data and performs the necessary image warping on the application output. This feature can be extended to color correction between projectors. The details of the end display device are shielded from the application developer.

High Level Primitives: The architecture shields developers from the complexities of the underlying graphics technology with a set of common high level primitives. These primitives represent common objects such as 2D objects, 3D objects, lines, webcams, pictures, video, sound, text, graphs, and binary data objects.

Scene Encapsulation: Finally, application developers take advantage of the above features by creating instances of "Controller" objects that encapsulate all objects, data, and logic within a given "scene." The architecture will display the output of one controller at a time, making a controller nearly synonymous with "application" or "episode". However, controllers can also be nested and otherwise used to place objects into individual batches. This helps application developers distribute development efforts across several people. It also helps to increase overall graphics performance as different batches can be updated at different frequencies if necessary.

Referring now to the drawing, FIG. 1 shows a system 100 for distributed information processing and interaction, and which supports navigation of complex application history. The system 100 includes a state server 102, a plurality of application processors or output devices 104 and an input/output (I/O) controller 106 with a plurality of input devices 108. The system 100 is an embodiment of an architecture that spans multiple, heterogeneous computer devices, multiple output devices and multiple modalities. The system 100 responds to inputs received from the input devices 108 to produce effects on the output devices 104. The effect produced may be identical for one or more output device, or the effect produced may be different depending on the effect and the particular output device. As will be described in further detail below, the effect produced on any one output device will depend on the nature of the output device and effect.

Generally, the state server 102 maintains the state or states of the system 100 and ensures that the output devices 104 are synchronized. The state server 102 communicates with the output devices 104 by sending messages, preferably with a predetermined message protocol. The state server 102 reflects all messages it receives about the system 100 back to all appropriate devices in the system, in particular, back to all the output devices 104. The state server 102 receives input signals from the input devices 108 and sends messages to the appropriate output devices 104 to synchronize the states of the output devices in a manner to be discussed in greater detail below. The input devices 108 may include any sort of sensor or data gathering device. The output devices 104 may include any sort of audio or video or other output device or system, including a personal computer (PC) such as a table PC, a personal digital assistant (PDA) or laptop computer or other specialized device or processor. The output devices 104 most generally include any type of actuator for causing an interaction or result in the environment.

The embodiment of FIG. 1 will be discussed in the context of an exemplary system in which a display image is controlled on a display surface 110 by the system 100. The display image is made up of a plurality of display devices 112. In the exemplary system, the display devices 112 are video projectors 114 under control of one or more respective application processors 116 arranged to project a display on panels 118 of a glass wall 120 forming the display surface 110. Any suitable number of projectors 114 and glass panels 118 may be used to form the display image. In the example of FIG. 1, a 2×4 array of projectors together form the display image on a similar array of glass panels 118. In other embodiments, other numbers of projectors and other numbers of glass panels may be used. In still other embodiments, other types of video display devices may be substituted, such as flat panel displays, plasma displays or cathode ray tubes. The principles described herein should not be limited by any particular technology by may be applied to the widest variety devices.

In the exemplary embodiment of FIG. 1, the input devices 108 include one or more cameras 122, a data glove 124, a pointing device 126 and an infrared sensor 128. As is indicated in the drawing other input devices similar to these or of other types may be added to the system 100. A camera 122 is a device which captures a video image. The image may be single images in any suitable format including digital formats such as jpeg (referring to a standard data format advanced by the Joint Photographic Experts Group) or gif (Graphics Interchange Format), or other, or the video images may be a motion picture image, such as a data file encoded according to a standard such as that proposed by the Motion Picture Experts Group (MPEG or one of its variants) or other standard. A data glove 124 is an input device for virtual reality and other data processing devices in the form of a glove which measures the movements of the wearer's fingers and transmits them to the data processing device or computer. Sophisticated data gloves also measure movement of the wrist and elbow, or other body part movements may be measured as well. A data glove may also contain control buttons or act as an output device, e.g. vibrating under control of the computer. The user usually sees a virtual image of the data glove and can point or grip and push objects. The pointing device 126 may be any data entry and manipulation device such as a computer mouse or pen tablet. The infrared sensor may be any sensing device that responds to heat, energy or radio emissions from a device to produce an image.

The I/O controller 106 serves as a data gathering interface between the system 100 and the input devices 108. The I/O controller 106 therefore is configured to receive signals from the respective input devices 108 and provide any necessary signals in return. For example, for receiving a jpeg format file from a camera 122, the I/O controller 106 receives a jpeg formatted file from the camera 122 and stores the file, providing appropriate network handshaking signals to the camera 122. In another example, the format maybe streamed data from another camera 120 or from the data glove 124. The I/O controller 106 provides the necessary handshaking signals to the input device and stores the received data for viewing, or immediately provides the data to the state server 102. The I/O controller 106 receives data from the input devices 108, in the format provided by each respective input device, and formats the data to the format required by the state server 102 and the output devices 104.

In the exemplary embodiment in which a display image is controlled on a display surface 110 by the system 100, the input devices 108 include sensing devices to detect a user's hand or other body part adjacent the display surface and acting as a pointing device to manipulate a portion of the image. For example, in one embodiment, the input devices 108 include a set of cameras positioned adjacent the display surface 110 to detect position and movement of a user's hand and, in conjunction with the I/O processor 106, to provide signals to the state server 102 indicating the position and motion of the user's hand. The signals are conveyed to the respective application processors 116 and used to produce an appropriate display or change in the display. For example, if the hand motion should be interpreted as a left click, right click or other mouse actuation of the display on the display surface 110, each respective application processor 116 will respond appropriately by processing the hand motion and, if appropriate, reflecting the hand motion in the display portion controlled by the respective application processor.

As noted, the output devices 104 in this embodiment include one or more display devices arranged to display respective display portions of an output display of the system. To accomplish this, the glass panels 118 of the display surface 120 and their associated projectors 114 are tiled so that together they form a composite image. Each image produced by each projector is unique and is produced under control of the application processor 116 associated with the display device.

In general, the application processors 116 are general purpose data processing systems customized by particular application software to perform a particular function in the system 100. The application processors 116 are coupled by data links to the state server 102. These may be wireline or wireless data links, or any suitable data communication devices. The application processors 116 may include or have associated therewith particular hardware components for producing a particular output actuation. One exemplary actuation for a general purpose output device is opening an electrically controlled lock at a remote location. In such an application, the application processor 116 cooperates with a servo motor or other device to mechanically open the lock. In general, then, each application processor is configured to process an application program and is responsive to context information. Each respective application processor is in data communication with an associated respective output device 104 for controlling the output device 104 in providing an output portion of the system output. The system output is the aggregate of the output portions of all the output devices 104.

In the particular exemplary embodiment of FIG. 1, the application processors 116 are customized for processing respective display portions of an output display of the system 100. Accordingly, the application processors receive data and instructions in the form of messages from the state processor 102 and provide control signals to one or more associated projectors 114. FIG. 1 shows an exemplary software architecture 130 of an application processor. The software architecture 130 includes core components 132 and an application layer 134. The core components 132 are aspects of the software architecture 130 that are shared by all developers preparing software applications for the application processor 116. Examples include input/output drivers, storage and retrieval routines and other operating system components. The application layer 134 includes functions, routines and other components which are customized by each developer of software for the application processor 116 to create a unique application behavior for the application processor.

The application layer 134 includes a message handler 136 and one or more objects 138. The message handler 136 communicates with the state server 102. in particular, the message handler 136 receives messages 140 from the state server 102 which define changes in the system 100 for processing by the respective application server. Further, the message handler sends messages 142 to the state server which define changes in the system produced at the respective application server and which should be reflected to other application servers 116. The messages are preferably formatted in accordance with a predefined data transmission protocol, including, for example, a header with source and destination addresses and a payload including data defining a change of state in the system. However, any suitable data transmission format may be substituted.

The objects 138 are instantiated by the developer of the application layer 134. Objects are discrete items that can be selected and maneuvered, such as an onscreen graphic. In object-oriented programming, objects include data and the procedures necessary to operate on that data. Operation of the application processor 116 under control of the application layer 134 may cause the objects to be generated and to operate. In the illustrated example, the objects 138 include their own message handlers to communicate with other portions of the application layer and the state server 102. Messages communicated by the objects 138 may receive updates to the system state that affect in individual object or may contain information about a changed detected or produced by the object that should be reflected by the state server 102 to the other application processors 116.

In accordance with the present invention, the architecture exemplified by FIG. 1 supports a shared state among multiple processors, such as the application processors 116, and multiple applications active on the processors 116, such as the application layer 134. Operation of the state server 102 ensures that the states of the application processors 116 are synchronized. In other words, the state server 102 operates to ensure that all state changes are reflected to all processors 116 as simultaneously as possible.

Synchronization in the present context means, most generally, that the state of each application processor is identical, to the extent that the states include the same information. For application processors running local copies of the same application program, the states are identical when each copy of the application has identical data. There may be variations in the respective applications. For example, in the specific example described herein, two or more application processors produce portions of an image on a display. Each processor is assigned to display a designated portion, referred to herein as its context, of the overall image. However, each processor maintains the data necessary to produce the entire image, not just its context. Data which are not part of the context are updated based on processing of the application and based on synchronization information received from the state server, so that the local copy of the application is synchronized or contains the same data as other copies which have other contexts.

In the present application, synchronization is not just synchronization in time. All synchronization involves a common framework. Synchronization relates to the local state or states of the application processors.

In a first example, time synchronization involves the server sending a message to all applications specifying the current time, for example, because the server accessed the system clock, which may be considered a time sensor. In response to this message, some applications on some of the application processors might simply update an animation. Others might perform some logic to map the new time to a higher level state change (e.g., to an indication that it is time for a train to arrive) and use the architecture to reflect that new state to the other applications. Other applications on other processors may not have any time-dependent aspects and so have no response to the message. Different applications respond to the reported state change appropriately.

In a second example, a train has a global positioning system (GPS) receiver, which forms a position sensor, and an application processor of the type described herein. The train and its application processor send a message reporting the GPS position data as the new state of the train. The message is received at the state server and is reflected to several other rail yard applications. For example, in a rail yard command center, the information in the message effects a change in a display of train position. In a computer room with data processing equipment, the message is handled with a database entry. In the rail yard, another application on another processor opens a gate.

In a third example, a touch screen sensor detects the location of a touch and reports the location to the state server. The server sends information about the state change to all applications in the system. One application maps that state change to a higher level state, "a button has been pressed." Another application maps the touch to a different higher level state, "there is human activity in the command center." Again, each application receives the same state update message and responds appropriately.

In each of these examples, time is handled in conceptually the same way as any other state change. Touch, motion, and any other sensor input to the system, such as swiping an identification card in a card reader or using a fingerprint reader are reported to the state server and are all handled the same way, appropriately for each application processor in the system. State changes are not necessarily handled homogeneously. One application might simply update a display. Another might actuate a robot.

Referring again to FIG. 1, in the most general applications, state changes are effected from a variety of sensors and/or program logic and are not limited to user interactions. Any information about a change of state is passed to the state server 102 which mirrors or re-transmits the information to others in the system 100, including the application processors 116. The application processors 116 or any other output devices 104 receive the updated state information from the state server and respond appropriately. The response might be to update data stored at the output device 104. The response might be to change a displayed image or program state. The response might be to provide some suitable actuation. In the most general case, the response of each output device is tailored to the nature of its operation or function and the updated state information.

In the particular application illustrated in FIG. 1, in which the output devices 104 include projectors 114 under control of application processors 116, state changes are effected from the input devices 108 or program logic operating on an application processor 116. In response to an input signal detected by the I/O processor 106, the state server 102 updates its state information and mirrors or re-transmits the information to others in the system 100, including the application processors 116. That is, each application processor 116 is configured to dispatch an update message to the state server 102 in response to processing an application program to produce a change in the image forming the respective display portion produced by the application processor. The state server 102 reflects the message to other application processors 116. The application processors 116 receive the updated state information from the state server 102 and respond appropriately. In this specific application of FIG. 1, the response of each application processor 116 is to change the display produced on its associated display screen 118.

In this particular embodiment, the cameras 122 positioned adjacent the display surface 120 operate as input detectors positioned to detect user activations occurring adjacent to one of the display devices formed by the display panels 118. In response to the detected user activations, the input detector or camera produces user activation signals. For example, the signals might be digital data defining the location in x and y coordinates where a user's hand is located at the surface of the display panels 118. The I/O processor 106 is in data communication with the input detectors formed by the cameras 120 and the state server 102 to convey information about the user activation signals. For example, the I/O processor may simply provide the x and y coordinate data, or the data may be enhanced or formatted with other information.

Further in the particular embodiment described herein, each of the application processors 116 runs substantially the same program, or identical application programs. Each application processor 116 maintains its own copy of the state of the system 100, updated in response to state messages received from the state server 102. Based on its local copy of the system state, each application processor 116 displays in predefined display portions on separate display devices 112 an output display of the application programs. The processing of the applications is synchronized by the state server 102 operating as a synchronizer. In this system, each respective application processor 116 controls a respective display device 112 for displaying a respective display portion of the output display on the respective display device 112.

When a user interaction (such as a hand near a display panel) is detected, at a respective application processor associated with the respective display device, the display is updated on the respective display portion. The state server as synchronizer conveys information about the user interaction to each of the respective application processors, each of which has all of the system data. However, each of the application processors is responsible for displaying its respective display portion. Therefore, an application processor updates its display portion only if the user interaction affected that display portion. For example, if a user moves a hand near the left-most panel of a 2×4 panel display in which each panel is controlled by its respective processor, the user interaction represented by the hand movement is reported by the state server to all processors. However, only the processor controlling the left-most panel changes the display produced on that panel to reflect the user interaction. All other displays remain unchanged, although all other processors have identical data matching. Each processor maintains its own context and updates its display only if the context has changed, requiring an update. The context information defines what display portion of the overall display is produced by the processor. In the same way, if a user interaction requires a change in the display to more than one display panel (e.g., because a new application window is opened on the display), the state of the system will reflect the changes to each respective context of each application processor that is affected. Because of the change within the context of the application processor, the processor's display is updated.

Figure 2:
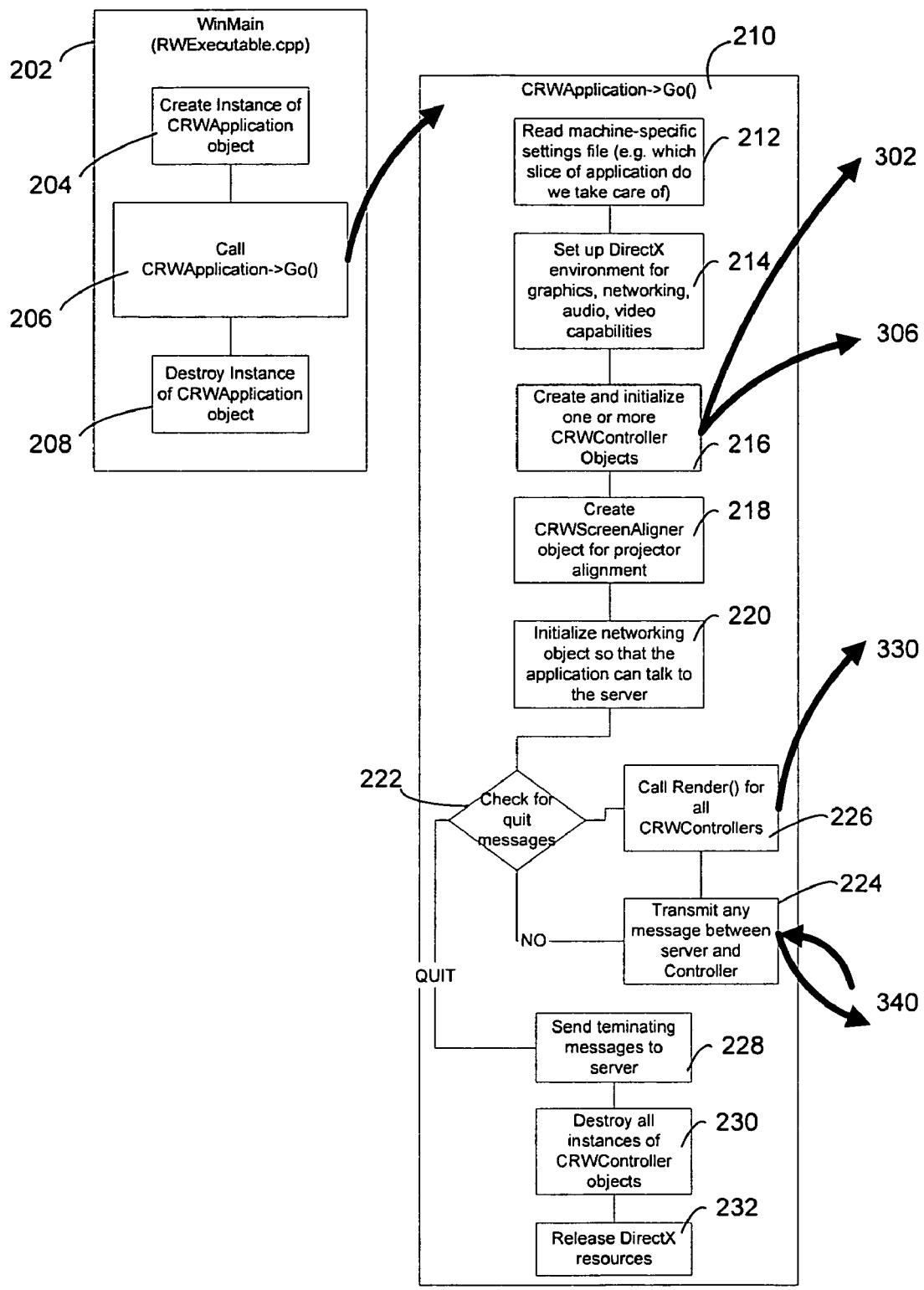
FIG. 2 is a flow diagram illustrating process flow in the system of FIG. 1.

FIG. 2 is a flow diagram illustrating process flow in the system of FIG. 1. In particular, FIG. 2 illustrates the particular embodiment of the system of FIG. 1 in which information is displayed and presented using a group of independent and synchronized application processors. Other methods of implementing the system of FIG. 1 may be substituted and variations on this embodiment may be readily deduced.

In FIG. 2, the process is implemented as computer code, in this example, a C++ code portion 202 entitled RWExecutable.cpp. The code portion 202 first creates an instance of an object called CRWApplication, block 204. The code portion 202 then calls the newly-created object, block 206. As is indicated by the line in FIG. 2, control then transfers to a code portion 210 which is the instantiation of CRWApplication. After processing of the code portion 210, the instance of CRWApplication is destroyed, block 208, by code portion 202.

Code portion 210 is an instantiation of the C++ object CRWApplication. This object handles setting up the graphics environment for applications in the system of FIG. 1. This object also initializes and maintains a list of all CRWController defined in the application, as will be described in further detail below. Contents include CRWScreenAlignmentObject, in case the application needs to be displayed through a multi-projector system.

The code portion or application 210 implements the flow diagram illustrated in FIG. 2. At block 212, the application 210 reads any files containing machine-specific settings. Examples of such settings include defining which slice of the or respective display portion this machine is responsible for processing. More broadly, the machine-specific settings define what output device is to be controlled by the machine. The output device may be a display device, an actuator or any other appropriate device.

At block 214, the application 210 sets up the DirectX environment for any required graphics, video, networking or audio capabilities. DirectX is a library for accessing several low-level functions such as networking, graphics, input, audio, and video. The system of the illustrated embodiment uses the graphics library most extensively, but the networking library is used for communication.

At block 216, the application 210 creates and initializes one or more CRWController objects. A controller object is a list of objects and the logic to send and receive messages from them. At block 218, the application 210 creates an object called CRWScreenAligner. This is an object that allows for use of a multi-projector tiling system in which the display of the application is spread seamlessly across a number of projected areas. By distorting the display output that is actually sent to the projector, this object corrects for the distortion of the projector, minimizing the seams between projection areas. The exact character of the correction is entirely user configurable through this object. At block 220, the application 210 initializes a networking object. This object allows the application processor to communicate over a network with other devices including the state server.

At block 222, the application 210 checks for quit messages or other data indicating the application should be terminated. If no such a message is received, at block 224 any pending message is transmitted from the application processor to the state server. At block 226, an object called Render is called to render an image on the display. Control remains in a loop including blocks 222, 224, 226 until a quit message is received. In response to a quit message, control proceeds to block 228 where the application 210 sends terminating messages to the state server to discontinue communication with the state server. At block 230, the application cleans up by destroying all instances of CRWController objects which have been created by the application. At block 232, all DirectX resources are released and the application terminates.

Figure 3:
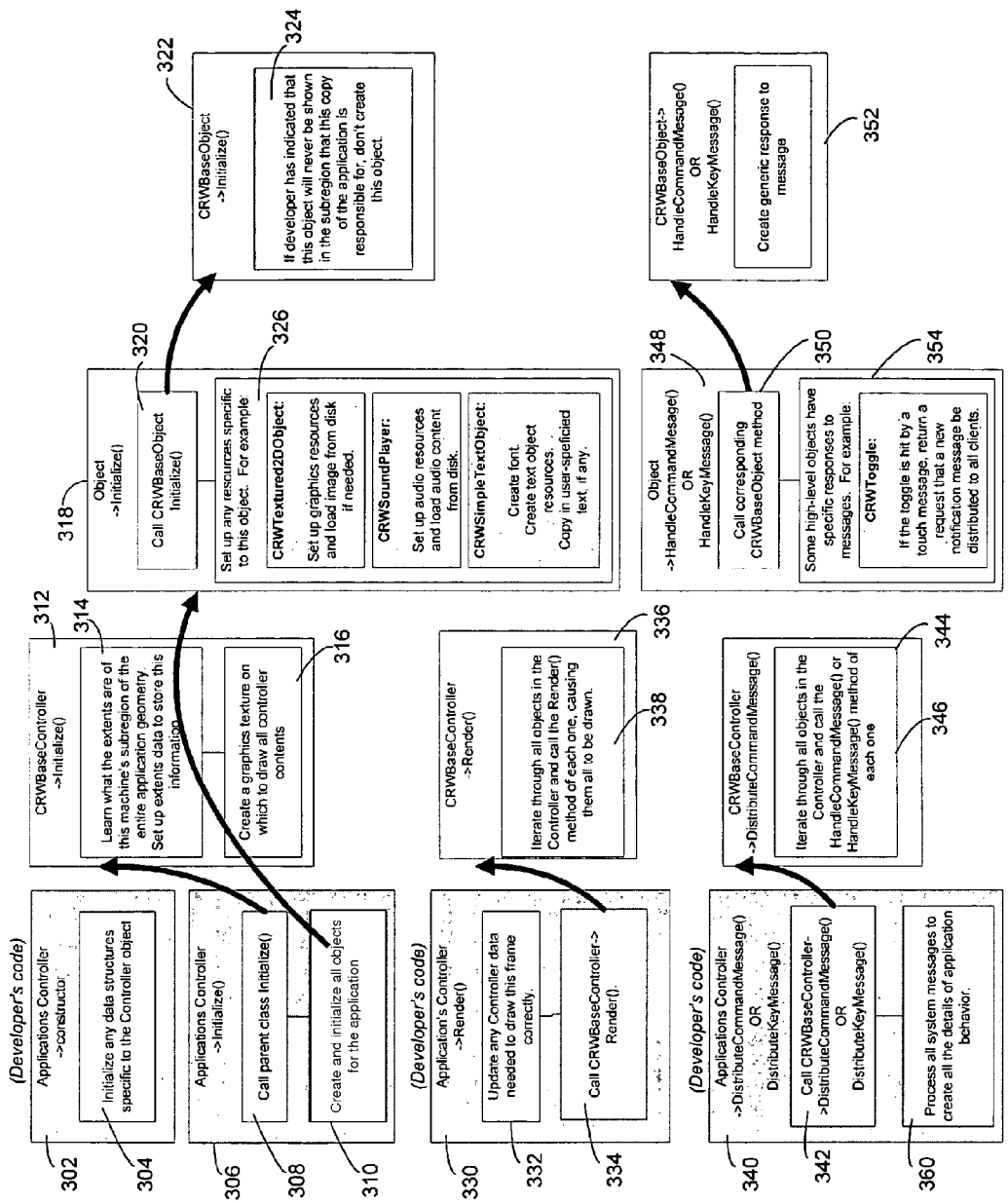
FIG. 3 is an architecture flow diagram for one software embodiment of the system of FIG. 1.

FIG. 3 illustrates an architecture flow diagram for one software embodiment of the system of FIG. 1. FIG. 3 illustrates operations resulting from actions occurring in the flow diagram of FIG. 2. In response to block 216, FIG. 2, code portion 302 is called to initialize any data structures which are specific to the Controller object, block 304. Also in response to block 216, code portion 306 is called to create and initialize all objects required for the application, blocks 308, 310.

Block 308 instantiates an interface 312 called CRWBaseController. CRWBaseController is an interface that defines the basic properties of a Controller object. Controllers contain a list of objects derived from CRWBaseObject, and the logic to send and receive messages from them. CRWBaseObject is an interface that defines the properties of a general object, such as a piece of text (a CRWSimpleTextObject), a picture (a CRWTextured2DObject), or a webcam feed (a CRWWebCamObject). Objects are created and maintained by Controllers. Objects have the ability to initialize, to draw their own contents every frame, and they can also respond to messages from the Controller to write an application in the system. The developer must write a class that inherits from, and implements, the CRWBaseController interface. The developer fills the Controller with objects, and by specifying logic of the objects, they define what the contents and the behavior of the application will be. Specifically, the CRWBaseController interface allows the application processor to learn the extents of the sub-region or respective display portion of the entire output display or application geometry, and set up extents data to store this information, block 314. These extents are also referred herein as the context for this application processor. Also, block 316, the CRWBaseController interface creates a graphics texture on which to draw controller contents.

Block 310 creates and initializes all objects for the application. In response to block 310, an object 318 is initialized. At block 320, an object CRWBaseObject 322 is called. As noted above, CRWBaseObject defines the functionality of a general object (for instance the general idea that objects are "rendered"). Pictures, videos, etc. (CRWVideoObject and others as described herein) inherit from and extend the base object (for instance, defining how that particular type of object is rendered). Thus, CRWBaseObject defines the basic set of commands all objects understand (Initialize, Render, etc.) and each object type defines how objects respond to those commands. This allows the controller to send commands to objects without needing to understand what they are exactly. The controller operates in terms of CRWBaseObjects, but each specialized object responds with specialized behavior.

The object is created and initialized at block 322. However, in block 324, if the application developer has indicated that this object will never be shown in the sub-region or respective display portion for which the copy is responsible, creation of the object is suppressed.

Referring again to block 318, following initialization of the CRWBaseObject at block 320, at block 326 any resource specific to the current object are initialized. A first example is a CRWTextured2DObject, which is a rectangle in two dimensional space, defined by two corner points. The rectangle can have a simple color, or it can hold an image (a "texture"). Available options include setting the color value of the object, rotating it, resizing it, setting its position, changing its transparency. Other similar examples include the following:

CRWLineObject, which is a line in two dimensional space, defined by two endpoints. The thickness and type of the line can be set, in addition to all the properties and settings that apply to CRWTextured2DObjects;

CRWMagLine, which is a polygon in two dimensional space, defined by four corner points. This allows more flexible geometry than a CRWTextured2DObject and is used mostly for visually connecting zoomed areas to unzoomed areas;

CRWWebCamObject which is a rectangle in two dimensional space, defined by two corner points. The object displays a continuous feed of images fetched from a server or webcam.

CRWVideoTexture which is an object that handles taking video from a file and writing it to a texture, and the associated operations on that file such as decompression.

CRWVideoObject which is similar to a CRWTextured2DObject, but holds a video clip (see CRWVideoTexture) instead of a still image.

CRWCompoundObject, which is an object that contains and manages a collection of objects, and draws the collection to a 2D texture, which can then be drawn onscreen. Compounded in this way, the objects in the collection can all share a coordinate system separated from the global coordinate system. Changing the location, scale, rotation, color, etc. of the compound object causes a proportionate change for all sub-objects.

CRWSimpleTextObject which is a chunk of text. Settings include size and shape of bounding rectangle, font height and width, color and transparency, and some formatting options (e.g. left and right justification).

CRWSpriteScatter, which is a collection of points in space, like pushpins on a map. The scale of the collection can be set by the user to any value. Each point in the collection can have a certain size and, optionally, hold an image. All the points have the same image; in this context, the images are called "sprites". Positions of the points can be read from a bitmap image, allowing the developer to position them visually.

CRWVideoSpriteScatter, which is similar to the CRWSpriteScatter, but each point can hold a video image, instead of a still image.

CRWStencilController. Stencils are used to define where objects are and aren't drawn. CRWStencilController is an object that defines a stencil and the various objects which are subject to that stencil. The object contains two lists: objects to be used as stencils, and drawn objects.

CRW3DObject, which is analogous to a CRWTextured2DObject, but its vertices occur in three dimensional space, and there can be many of them. Object knows how to load vertex lists from a file, and do three dimensional lighting and transformations.

RW3DRenderObject, which is an object that contains and manages a collection of three dimensional Objects in a scene, and draws that scene to a two dimensional texture, which can then be drawn onscreen.

RW3DBillBoardObject, which is an object that creates a two dimensional object in a three dimensional world, and dynamically updates its orientation so that it always faces the viewer.

CRWSoundPlayer, an object that is tied to an audio file on disk. Methods include play, pause, stop, etc.

CRWDataBundle, an object for holding data in row-and-column format. Data can be inserted functionally by the user, or can be loaded from a properly formatted text file. Data contents can also be written to a formatted text file. CRWDataBundles can be used to provide a set of data for display by an implementer of the CRWChart interface (such as CRWPieChart).

CRWChart, an abstract class (or interface) that defines the properties and methods which all chart objects have in common, including their data underpinnings.

CRWPieChart, a pie chart object, implementing the CRWChart interface. Data contents are defined with a CRWDataBundle.

CRWLineChart, a line chart object, implementing the CRWChart interface. Data contents are defined with a CRWDataBundle.

CRWBarChart, a bar chart object, implementing the CRWChart interface. Data contents are defined with a CRWDataBundle.

CRWScatterPlotChart, a scatter plot chart object, implementing the CRWChart interface. Data contents are defined with a CRWDataBundle.

CRWToggle, an object that acts as a button when placed in the context of the touchscreen messaging system. The object listens for touch messages within a coordinate range which corresponds to its boundaries; when triggered, it raises some preset message, which is passed to the server and rebroadcast to all machines on the network, alerting everyone to the state change. The object knows its own state, and also controls how often it can be triggered.

CRWWhiteboardObject, an object that holds a collection of lines or dots arranged on a two dimensional surface. These lines or dots represent "marks" on a whiteboard. Marks can be added to or subtracted from the whiteboard by the user of object.

CRWValueInterpolatorObject, an object which acts like a stopwatch. It is initialized with a start time, a duration, and a starting and stopping value. Over that duration of time, it takes the start value and changes it into the stopping value (i.e. it "interpolates" the value). Objects and Controllers use this object to help them do animation smoothly.

CRWBezierInterpolatorObject, which is similar to CRWValueInterpolatorObject, but uses a specialized Bezier function to interpolate.

At FIG. 2, block 226, a routine Render() was called for all CRWControllers. In this case, control proceeds to the developer's code at block 330, FIG. 3. There, the applications controller updates any Controller data needed to correctly draw the frame, block 332, and instantiates a CRWBaseController object to render the frame, block 334. The CRWBaseController instantiation 336 iterates through all objects in the controller and calls a Render() method for each object, block 338. This causes all objects to be drawn.

At FIG. 2, block 224, messages were transmitted between the state server and the Controller. In this case, control proceeds to the developer's code 340. The code 340 processes a DistributeCommandMessage or a DistributeKeyMessage. At block 342, the CRWBaseController 344 for the message type is called. This object iterates through all objects in the Controller and calls the appropriate object 348 to handle the message for each object, block 346. Thus, the object 348 at block 350 calls a corresponding CRWBaseObject method, block 352, and processes specific responses associated with some high-level objects, block 354.

After the developer's code 340 processes block 342, at block 360, all system messages are processed to create the details of the behavior of the system.

From the foregoing, it can be seen that the presently disclosed embodiments provide system and method for distributed information processing and interaction. In one general embodiment, application processors respond to one or more software applications to produce outputs, the respective outputs together forming a system output. Each change in state of an application processor is reported in a state change message to a state server which reflects the message to all other application processors in the system. Also, any system inputs are reported to the state server which again reflects the state change to all application processors. In this way, the application processors are maintained in synchronous states. Output changes in one processor that should be reflected in the outputs of other processors are done so, automatically and seamlessly.

Each application processor may drive a display device which produces one image tile of a tiled output display. An application processor may be any data processing device, including, as examples, desktop or laptop computer systems, PDAs, or any other processing device. Furthermore, an image tile may extend over multiple displays. Each processor uses the state change messages from the state server to update state information for the entire display, even though the processor is responsible for displaying only a designated portion of the display. The assigned, designated portion of the display is the context of the processor. An input device detects user interaction with the display, similar to mouse movements and mouse clicks but, in one embodiment, hand motions in front of the display. Detected user interactions are reported to the state server and information about the user interactions is reflected from the state server to the application processors which produce the image. The image is updated based on the information from the state server.

Figure 4:
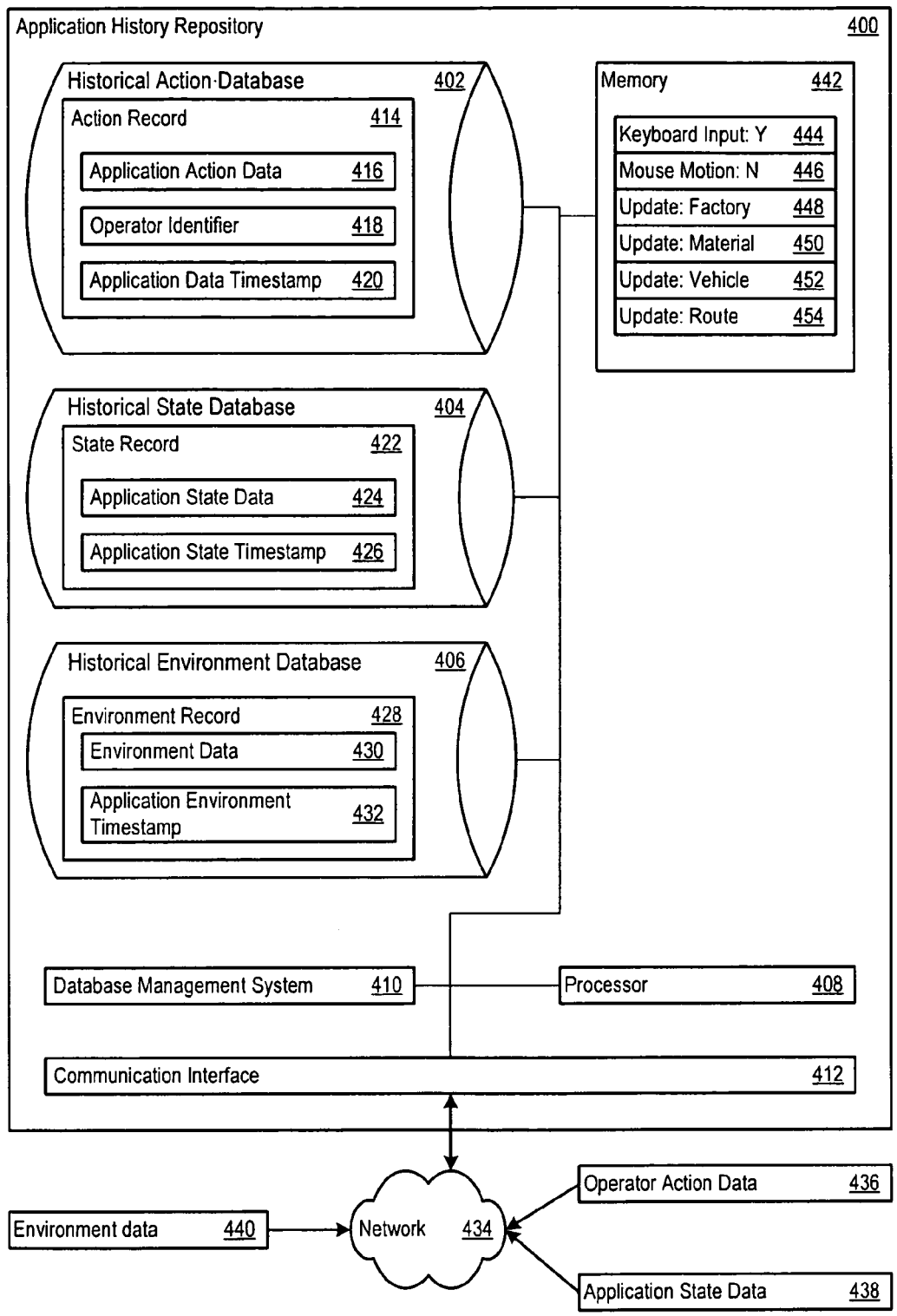
FIG. 4 shows an application history repository which may provide historical application state data, application action data, and environment data to the information processing system shown in FIG. 1.

FIG. 4 shows an application history repository 400. The repository 400 provides one mechanism for storing data concerning the development of an application over time. In the discussion below, the application is a materials routing and delivery application which coordinates the delivery of a wide variety of materials to different manufacturing plants. The application is not limited to materials routing however. Instead, the application may be virtually any application, including, as examples, chemical reaction modeling; energy (e.g., oil or gas) supply routing; hospital administration and work assignment and scheduling; simulations, such as a wargame, the spread of a pathogen, or the interaction of atomic nuclei; selection of parts and assembly of a complex structure, such as a watch, microprocessor, or an airplane; pharmacokinetics prediction; cardiotoxicity prediction; determination of business structure, such as how many and where to build factories or stores, or how to allocate resources among factories or stores; or civil engineering tasks, such as planning of new roads or modification of existing roads, including estimated or simulated traffic loads and travel times.

The repository 400 includes a historical action database 402, a historical state database 404, and a historical environment database 406. A data processor 408 executes a database management program 410, which stores data in the databases 402-406 after receipt at the communication interface 412. More specifically, the historical action database 402 may store action records 414. Each action record may include application action data 416, an operator identifier 418, and an application data timestamp 420. More, fewer, or different types of data may be present in the action record, however. The application action data 416 represents an action taken on an application at a given action time. The operator identifier provides an identifier (e.g., an alphanumeric string) of the operator responsible for the action. If multiple operators are jointly responsible for an action, the action record 414 may include an operator identifier for each responsible operator. The application data timestamp 420 identifies the time at which the operator took the action on the application (the "application time").

The application action data 416 may vary widely in type, form, and content to represent any action taken on or with respect to an application. Examples of actions for a materials shipment routing application include: assigning a material to a transportation vehicle (e.g., a train, truck, or plane); changing the delivery schedule of materials; changing the availability of a transportation vehicle; changing the factories or plants at which material is needed; changing the material needed at the factory; changing the time or date the material is needed; adding a new factory, product, material supplier, material, transportation vehicle, or transportation route; changing the maximum, minimum, or expected speed of a delivery vehicle; changing an expense of one or more types of transportation, material, or product; setting or changing the products manufactured by a factory, or the volume manufactured by a factory; annotating a display shown on the display surface 110; and changing labels, tags, or other descriptors for the factories, stores, transportation vehicles, or materials.

Other types of application actions may also be monitored, tracked, and recorded. As examples, such actions may include selecting a part of a map on the display surface 110; zooming in or out to view additional detail on the map; causing a report to be displayed on the display surface 110; or scrolling through information on the display surface 110. Additional examples include moving a pointer (e.g., a mouse pointer), clicking a button, entering a keyboard keystroke, touching the display surface 110, or dragging a pointer (e.g., a finger) on the display surface 110.

In general, the operator acts which qualify as application actions may be pre-configured, selected at run-time, or changed while the application executes. For example, action preference settings in a memory in the system may identify those operator acts which are considered application acts. Then, as the operator acts, the system may determine whether the act qualifies as an application action to be stored in the historical action database 402.

FIG. 4 shows an example in which the application history repository 400 may include a memory 442 which stores the action preference settings. As shown in FIG. 4, the action preference setting 444 indicates that keyboard input to the application will be recorded as application actions in the historical action database 402. The action preference setting 446 indicates that mouse motions will not be recorded as application actions in the historical action database 402. Furthermore, in the example of FIG. 4, the action preference settings 448, 450, 452, and 454 specify that updates (e.g., changes in name, type, location or any other characteristic) to factories, materials, vehicles, and vehicle routes will be recorded as application actions in the historical action database 402.

Thus, when operator action data 436 arrives, the processor 408 may compare the operator action data (e.g., including an action identifier) with the preference settings to determine whether the database management program 410 should save the operator action as an application action in the historical action database 402. In other implementations, the operator actions may be filtered prior to transmission to the application history repository 400. In that case, the application history repository 400 may save each operator action in the historical action database 402, or may perform additional filtering using local action preference settings in the memory 442.

In addition to the storing the actions taken with respect to the application, the application history repository 400 also stores application states. In particular, the historical state database 404 stores state records 422. The state records 422 include application state data 424 which represents an application state at a given state time, and an application state timestamp 426 which represents the state time (i.e., the time at which the application state was captured, as represented by the application state data 424).

The current application state may be reflected in the variables which specify the current characteristics or attributes of any part of the application. Thus, the application state data 424 may represent the application state as an application snapshot in time, including as examples, the number, type, position, speed, and current cargo of transportation vehicles; the number, type, location, and products output by factories; current delivery schedules or expectations for one or more products; the quantity, type, and cost of materials currently needed at a factory; current projections of material shortfalls, or excesses, and the workers currently assigned to each factory or transportation vehicle. The application state may also include tabular data such as amounts, costs, and credits relating to the entities shown or manipulated in the application.

Application state may also include data received by the system 100 (e.g., over a network). One example of such network data includes web page data displayed with or integrated into the application. Other examples are symbols (e.g., map symbols), annotations, or emendations made to or added to the application shown on the display surface 110. Another example is a real-time cloud layer received from an external weather reporting system and overlaid on a map incorporated into the application on the display surface 110.

The discussion below relates to environment data which reflects the context in which the application exists. The distinction between environment data and application state is a flexible one. Additional or different distinctions or dividing lines between distinctions may be determined and implemented in the application history repository 400. Thus, for example, a door lock sensor may provide environment data relating to the individuals in the room with the display surface 110. On the other hand, an application which displays a door lock interface which may be manipulated by the operator may have an application state which includes the operation and status of the door lock and the doors it controls. In one implementation, a distinction between environment data and application state may be made based on the core functionality of the application. Environment data may then reflect what is happening around the application, while the application state may reflect what the application is actually doing, processing, or displaying.

The historical environment database 406 stores contextual data. In particular, the historical environment database 406 stores environment records 428. The environment records 428 may include environment data 430 and an application environment timestamp 432. The application environment timestamp 432 represents the time and/or date at which the environment data 430 was captured.

The environment data 430 provides the context in which application actions occur and in which an application state exists. The context may be local or remote. Examples of environment data include audio capture or video capture of the environment in which the application is developed, studied, used, or modified. The environment data may be gathered from multiple locations (e.g., in a distributed development environment) which may be nearby (e.g., in different rooms of the same building) or geographically dispersed (e.g., in an office in Los Angeles, Chicago, and New York). Additional examples of local environment data include the number, identity, and characteristics of people in the area (e.g., in a planning room), the length of time one or more people have been working on the application, the room temperature, noise levels, weather conditions, and other environment data. Other environment data may arise from context provided by biosensors which read and report operator biodata such as heart rate, blood pressure, brain wave activity, weight, height, temperature, or any other biodata.

The environment data 430 may also include information from other information sources which are not necessarily directly involved with the application itself. This additional environment data may be timestamped for storage and later retrieval and playback. The other information sources may represent web sites, free or subscription electronic databases, news groups, electronic news feeds, journal article databases, manual data entry services, or other information sources.

Figure 5:
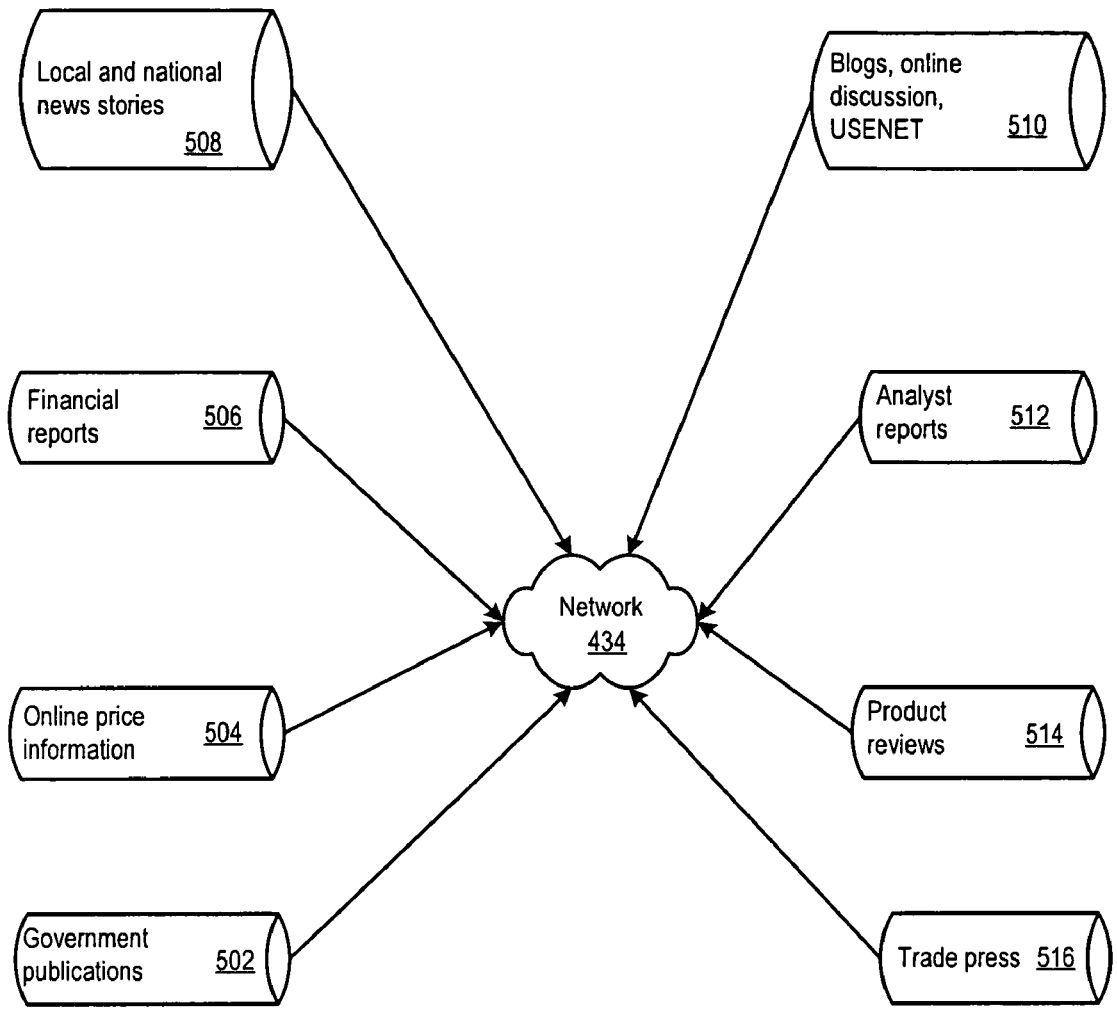
FIG. 5 shows information sources which may provide historical context data for application actions.

Examples of other information sources, as shown in FIG. 5, include government publication information sources 502, online price information sources 504, financial report information sources 506, and local and national news information sources 508. The information sources may also include one or more blog, online discussion, or USENET information sources 510, analyst report information sources 512, product review information sources 514, and trade press information sources 516. The information sources 502-516 are examples only, and the repository 400 may receive environment data from any other information source.

Generally, these sources include local and national new stories available on the Internet or privately paid subscriptions services such as Lexis/Nexis. Company financial reports may also be available on the corporate websites or on government reporting websites. Pricing information of products is frequently available online and the sources of information may be monitored for changes and introduction of new information. Additional sources of information include government publications, product reviews, analyst reports and the trade press as well as less credible sources of information such as web blogs and online community discussion bulletin boards or chat rooms.

Returning to FIG. 4, the communication interface 412 receives the historical data relating to the application displayed on the display surface 110 through the communication network 434. As examples, the communication interface 412 may receive operator action data 436, application state data 438, and environment data 440. The environment data 440 may be provided by the sources of local and remote context, as described above. The operator action data 436 may by provided by the system 100 which detects and responds to operator interaction with the display surface 110 on which the application is displayed. For example, the operator actions may result from operator input through the input devices 108, or from other input devices such as speech recognition systems in communication with the system 100.

The application state data 438 may also by provided by the system 100. In particular, the system 100 may, at any given time, provide a snapshot of the current application state and deliver the state data to the repository 400. The application state data 438 may represent the variables which specify the current characteristics or attributes of the whole application or any part of the application. For example, in response to an operator request to save the application state, the system 100 may serialize each application object to provide a binary representation of each object. The binary representation, from which the application objects may be recreated, may then be provided as application state data 438 to the repository 400.

As noted above, the repository 400 may tag each application action represented by an action record 414 with an operator identifier 418. As a result, the history of the application is tracked not only in the global sense, but also with respect to potentially many individual actors. In other words, the operator identifiers 418 allow the repository to distinguish between multiple operators and identify which operator was responsible for any given application action. For complex applications on which large groups of people work, the operator identification can be a very beneficial additional piece of information to have when reviewing the application history. The operator identification data may be included with the operator action data 436.

Figure 6:
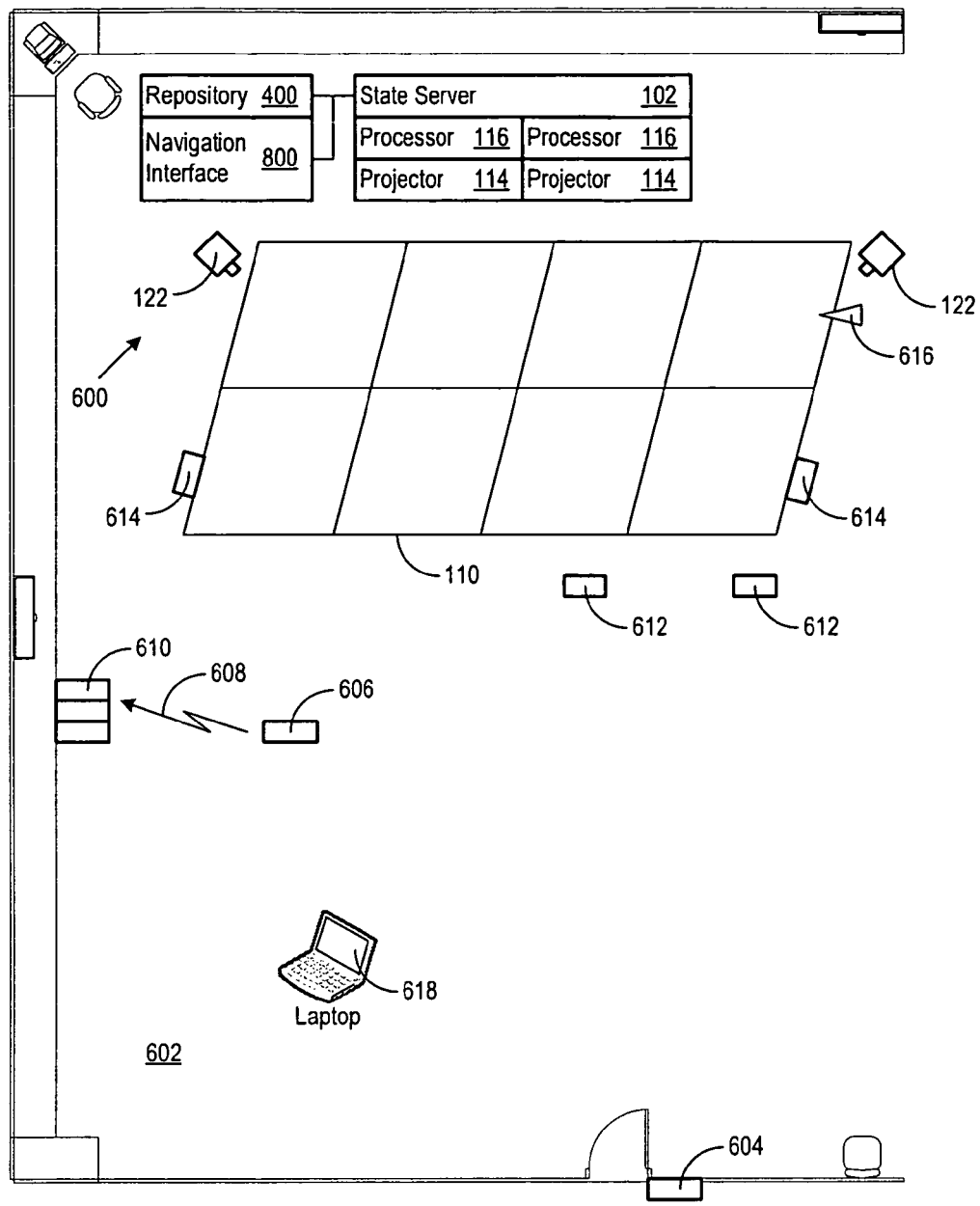
FIG. 6 shows a strategic planning room in which an application navigation system allows operators to navigate application history.

FIG. 6 shows one implementation of an application navigation system 600. The navigation system 600 includes an application history repository 400, a navigation interface system 800 (described below), and an implementation of the distributed information processing system 100, including a display surface 110. The application navigation system 600 is located in a strategic planning room 602 in which one or more operators may study, modify, or comment on the application displayed on the display surface 110. As noted above, the repository may store each application action according to the operator or operators responsible for the action. The data defining each application action may be received by the sensors noted below, as examples, packaged into a reporting message (e.g., an XML reporting message) by the information processing system 100, and delivered to the application history repository 400.

The strategic planning room 602 incorporates identification technologies which offer progressively more information about operator identity and their application actions which influence the application state. One way to distinguish the identification technologies is to consider them part of categories, such as a presence category, a usage category, and an input category. The identification technologies may be categorized in other manners, however.

With regard to the presence category, the operator identification information conveys that a given operator was present during an application action and the time that they were present. As one example, a key card door lock 604 (or other door or lock sensor) may provide the identity of an individual in the strategic planning room 602 and the time when the card was swiped to enter the room 602. Operator identification updates may be issued whenever the key card door lock 604 detects a key swipe.

As another example, an operator may wear a badge 606 or other indicia which may be sensed. The badges 606 transmit an ID signal 608 to one or more detectors 610 placed around the room 602. In one implementation, the badge 606 is part of an infrared or RFID badge system. The detectors 610 may be positioned on the ceiling or walls of the room 602. The badge 606 emits a unique operator identifier in the infrared or RF spectrum. The detectors 610 may report to the information processing system 100 or the application history repository 400, as operator identification data, the detected operator identifier and any additional information available, such as which part of the room the operator is in (e.g., based on a triangulation or other location technical employed by multiple detectors 610).

The identification technologies in the usage category may provide information about operator identity, for example when it is known that the operator was present, and when there is a greater degree of certainty about when. Generally, more evidence is available that the operator actually generated an application action. As one example, a localized tagging system may be employed.

The localized tagging system may include electronic badges 612 and sensors 614. The badges 612 and sensors 614 operate at power levels defining a localized area, for example, 0-48 inches, 0-36 inches, 0-24 inches, or 0-12 inches from the display surface 110. The tagging system may operate in a wide band spectrum to support high bandwidth communication of operator identification data to the repository 400 with greater accuracy, resolution, and frequency than more coarse sensor systems. Accordingly, the tagging system may detect not only whether an operator is in the planning room 602, but which operators are near the display surface 110 itself. Even when it is not possible to determine precisely which operator was responsible for an application action, the sensors 614 may provide a list of operator identifiers who may have taken the application action, and who may have witnessed, supported, or contributed to the application action.

The identification technologies in the input category may provide information about the operator identity, the time of the application action taken by the operator, and the particular application action taken by the operator. These identification technologies are better suited to specifically tying an application action to a specific operator. Examples are given below.

As one example, the operator may carry an identifying input device, such as a stylus 616, which the system 100 may distinguish from other styluses or other input devices. The stylus of each operator may be distinguished by color, shape, size, or other characteristic. As a result, the cameras 122 may capture characteristics of the stylus (e.g., the stylus shape or color) which permits a correspondence to be determined between the operator (known to use the stylus) and the application action. The identifying characteristics of the stylus may then be correlated with an operator identity and may be communicated to the repository 400. Alternatively or additionally, the stylus may include an RFID tag or other electronic identifying mechanism which communicates an operator identifier to the system 100 or to a sensor connected to the system.

As another example, the information processing system 100 may receive application actions from other input mechanisms such as a laptop, PDA, desktop computer, cellular phone. These input mechanisms may incorporate an authentication system (e.g., a username/password, or public key/ private key system). When the laptop 618, for example, connects to the information processing system 100 (e.g., through a WiFi, Ethernet, or other network connection), the information processing system 100 may authenticate and identify the operator of the laptop 618 or the laptop 618 itself. As a result, any application action taken or submitted through the laptop 618 may be identified as caused by the operator associated with the laptop 618 (or identified as originating from the laptop 618 itself).

As shown in FIG. 6, the repository 400 may communicate with the information processing system 100. In response to an operator request to navigate through the history the application, the information processing system 100 may query the databases in the repository 400 for historical action data, application state data, and environment data. Alternatively, the request for application navigation may come from another source (e.g., directly from the operator), with the repository 400 responding to the request and providing the historical data to the information processing system 100.

Figure 7:
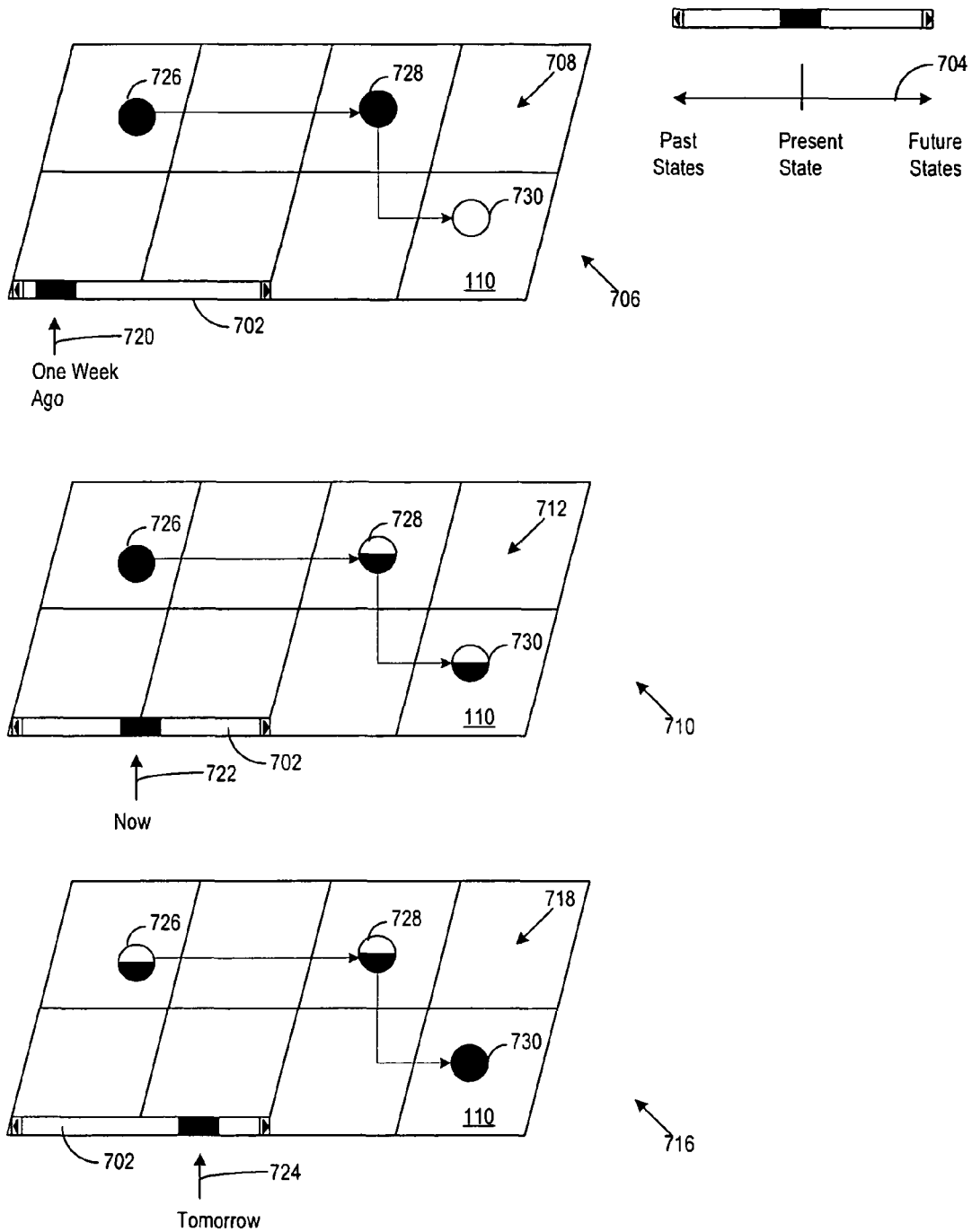
FIG. 7 illustrates a temporal selection interface for navigating application state.

In one implementation, the information processing system 100 generates a temporal selection interface element. The operator may use the temporal selection interface element to navigate through application history. FIG. 7 shows an example of the display surface 110 on which the information processing system 100 generates a temporal selection interface element 702.

In this case the temporal selection interface element 702 is a scrollbar rendered on the display surface 110. In other implementations, the temporal selection interface may include a voice recognition system, menu selection, mouse wheel, or any other input mechanism. The temporal selection interface allows the operator to provide one or more temporal selections (i.e., a time and/or date) at which to view application history.

The temporal selection interface element adheres to a usage semantic 704. As shown in FIG. 7, the usage semantic 704 establishes that the center of the scrollbar represents the present state of the application, that scrolling to the left navigates back in time, and that scrolling to the right navigates the application forward in time. In response to a temporal selection (e.g., 'one week ago', 'one hour from now', or 'now') obtained form the temporal selection interface element 702, the information processing system 100 generates an application representation on the display surface 110.

The application representation is a rendering of the application at the time selected by the temporal interface element 702. To create the application representation, the information processing system 100 may initiate queries of the databases 402-406 in the repository 400. The queries may specify the temporal selection, resulting in retrieved application state data, application action data, and environment data.

When the application state data includes a snapshot of the application state at the time specified by the temporal selection (or within a pre-selected operator or system selected time threshold), the information processing system 100 may render the application representation from the retrieved application state data. When the application state data does not include a snapshot of the application at the specified time, the information processing system 100 may start with application state data close in time to the specified time. The information processing system 100 may then apply the subsequent operator actions specified by the retrieved application action data to arrive at the application state at the specified time. Alternatively, the information processing system 100 may start at the beginning of the application, and re-apply each application action until the specified time, to reach the application state to render on the display surface 110.

In addition, the information processing system 100 may playback the operator actions and playback or convey the environment that existed during each operator action and/or application state. Thus, for example, as the information processing system 100 applies an operator action, the information processing system 100 may display the application action. As examples, the information processing system may show a mouse cursor move to a selection menu and pick an option, or may print a text message which describes the application action and its parameters. In addition, the information processing system 100 may output the retrieved environment data. For instance, the information processing system 100 may output audio or video data capture from the planning room 602 contemporaneous with the application actions, optionally supplemented by contemporaneous news stories or other context information obtained from the information sources shown in FIG. 5.

Referring again to FIG. 7, that Figure shows a navigation example 706 in which the operator has provided a temporal selection 720 which specifies a time near the beginning of the application development. As a result, the application representation 708 shows the application state near the beginning of the application (e.g., three component inventory levels with connections representing dependencies on other components). As shown in the navigation example 706, the component inventory levels 726 and 728 represent full stock for two components, while the inventory level 730 shows that there is no inventory yet for the third component.

FIG. 7 also shows a second navigation example 710. In the second example 710, the operator has provided a temporal selection 722 which specifies the present. Accordingly, the information processing system 100 displays an application representation 712 which shows the current application state. In the current application state, the first component inventory level 726 remains full, while the second inventory level 728 has dropped to half capacity. In addition, the third inventory level 730 shows that supplies of the third component have reached half capacity.

FIG. 7 also shows a third navigation example 716 in which the operator has specified a temporal selection 724 corresponding to a future time (i.e., tomorrow). In response, the information processing system 100 may apply predictive modeling, growth forecasting, extrapolation, or interpolation techniques to obtain predictions of the future application state. As one example, the information processing system 100 may predict inventory component levels based on historical levels of component consumption, manufacturing, and replenishment. In the predicted application state, the first and second inventory levels 726 and 728 show half capacity, while the third inventory level 730 shows full capacity.

As another example, the information processing system 100 may predict transportation vehicle locations by extrapolating their current speed, consulting established travel schedules, or using other factors. As yet another example, the information processing system 100 may predict the number of factories which will be in existence depending on historical manufacturing growth rates. The application representation 718 shows the predicted future state of the application at the time represented by the temporal selection in response to the predictive modeling, growth forecasting, extrapolation, interpolation, or other predictive techniques.

Alternatively, the information processing system 100 may communicate the present state of the application to a separate predictive modeling system, along with the future temporal selection 724. The predictive modeling system may then apply any predictive modeling, growth forecasting, extrapolation, or interpolation techniques to the present state. The resulting predicted future application state to the information processing system 100 for rendering on the display surface 100 or for storage as a future application state in the application history repository 400.

Figure 8:
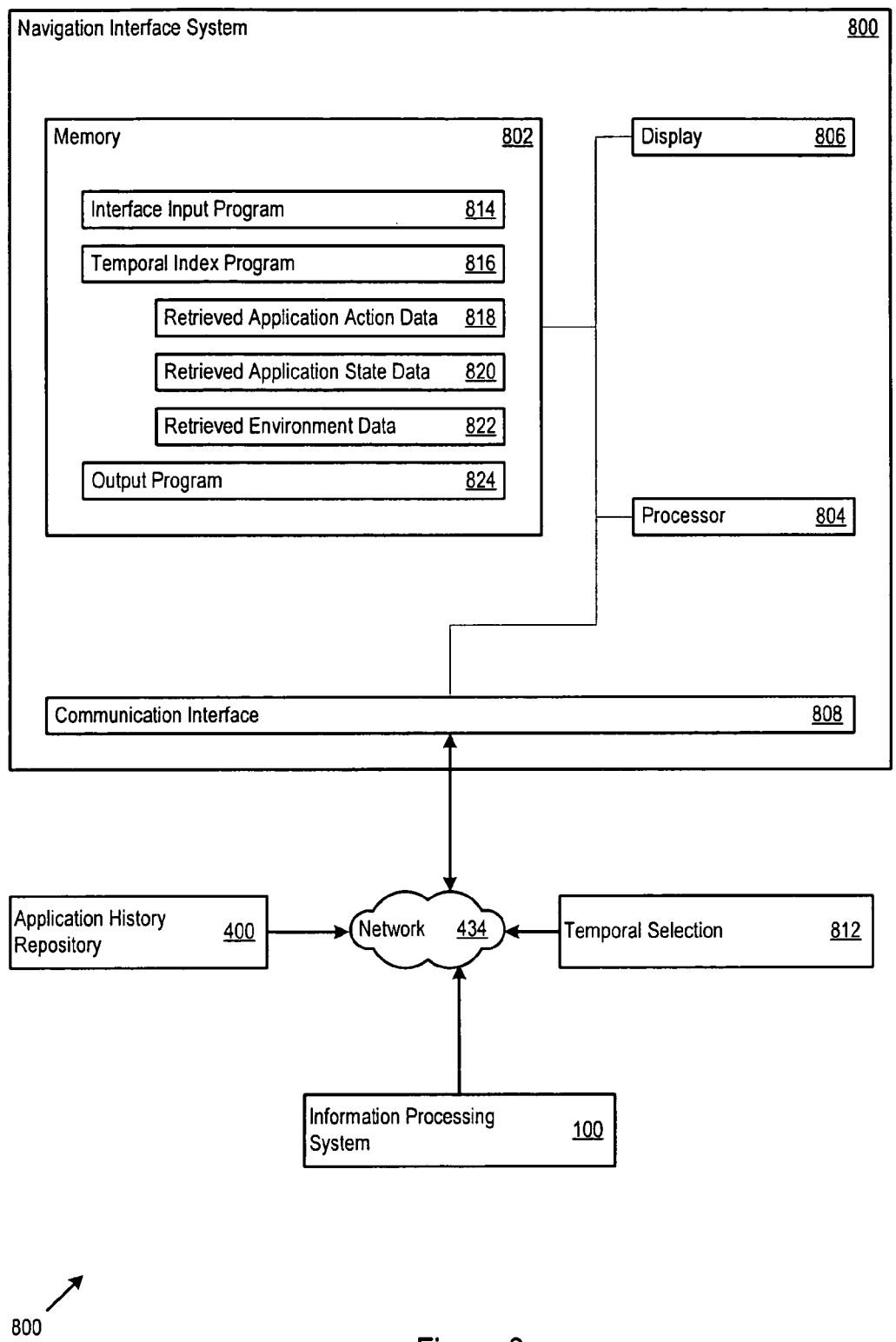
FIG. 8 shows a navigation interface for navigating application state.

In FIG. 8, an operator navigation interface system 800 receives navigation requests and temporal selections, and coordinates display of the application state with the information processing system 100. In other implementations, the hardware and software shown in FIG. 8 may be incorporated into the state server 102, or may be implemented on other processing systems in communication with the information processing system 100 and/or application history repository 400.

The navigation interface system 800 includes a memory 802, a processor 804, and a display 806. The navigation interface also includes a communication interface 808 which communicates over the network 434 with the application history repository 400 and the information processing system 100. The navigation interface system 800 receives a temporal selection 812 from an application operator, from the information processing system 100, or from another source.

More specifically, the interface input program 814 running in the memory 802 obtains the temporal selection 812. The interface input program 814 may be a device driver, for example, which receives mouse, keyboard, or touchscreen input. As other examples, the interface input program 814 may be a voice recognition system, or a message receiver which receives operator input data from the information processing system 100. In the later case, the interface input program 814 may receive messages from the information processing system 100 that indicate that the operator has made a temporal selection using the temporal selection interface 702 on the display surface 110.

In response to the temporal selection, the temporal index program 816 initiates searches of the databases 402-406 in the application history repository 400. The temporal index program 816 specifies the temporal selection for the searches. The searches may include one or more of any combination of an action search of the historical action database 402, which results in retrieved application action data 818, a state search of the historical state database 404, which results in retrieved application state data 820, and an environment search of the historical environment database 406, which results in retrieved environment data 822.

The output program 824 provides the retrieved data 818-822 to the information processing system 100. The information processing system 100 may then render application representations on the display surface 110 based on the temporal selection as described above. It is not necessary that the display surface 110 be used to display the application history. Instead, any other display, such as the display 806, may display all or part of the application history, including the application state, application actions, and environment data. The output program 824 may also assist the information processing system 100 to convey the application history. For example, the output program may include audio and/or video coder/decoders to reproduce audio and video context data which is contemporaneous with any application action or application state.

Figure 9:
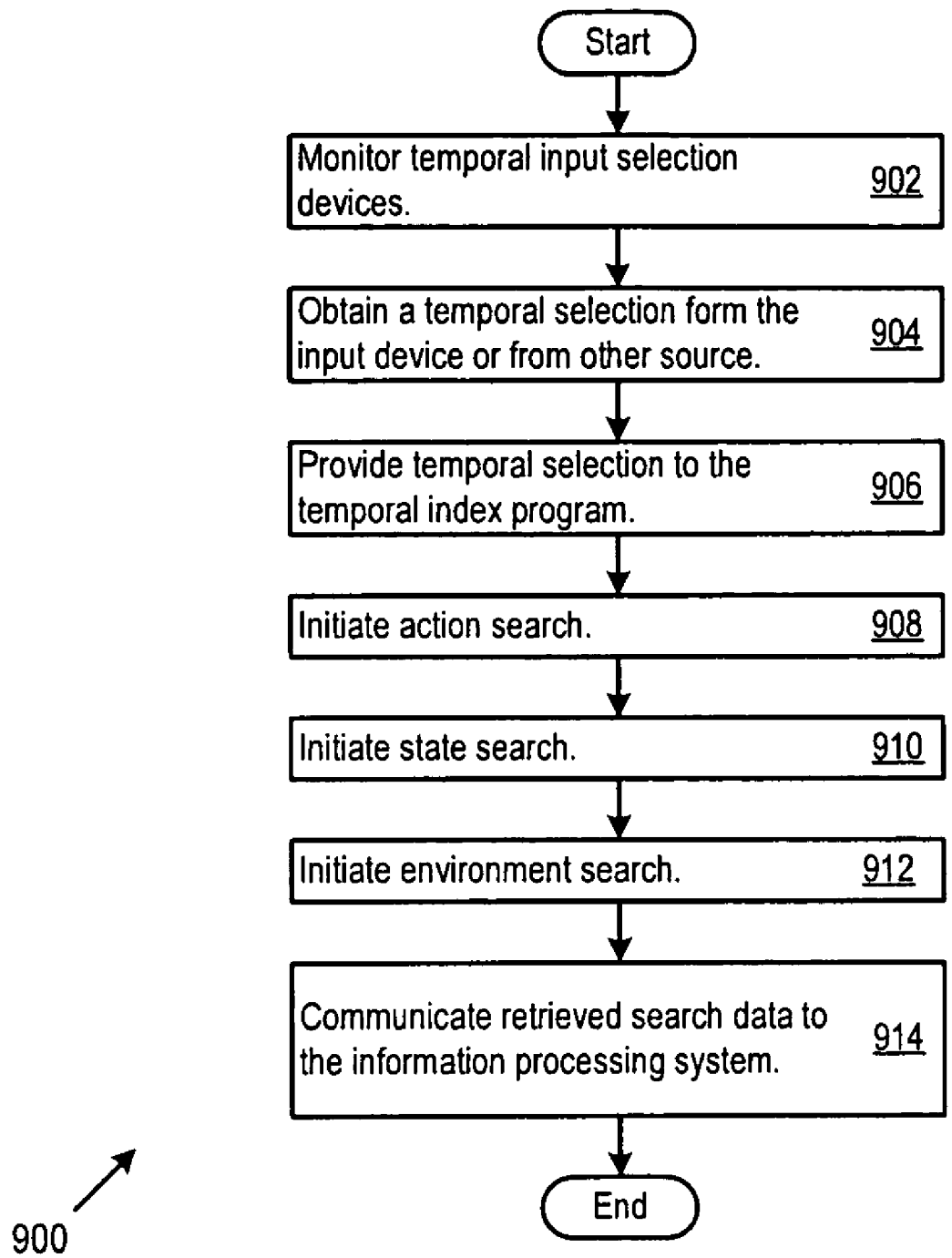
FIG. 9 shows acts which the navigation interface may take when navigating application state.

FIG. 9 shows an example of the acts which the navigation interface system 800 and programs 814, 816, and 824 may take. The interface input program 814 monitors one or more temporal input selection devices (Act 902). The interface input program 814 obtains a temporal selection which an operator has specified (Act 904) using a temporal selection interface element. Alternatively, the interface input program 814 may obtain the temporal selection in a message from the information processing system 100, or from another source. The interface input program 814 provides the temporal selection to the temporal index program 816 (Act 906).

The temporal index program 816 initiates an action search of the historical action database 402 (Act 908). Retrieved application action data 818 results. The temporal index program 816 also initiates a state search of the historical state database 404 (Act 910). Retrieved application state data 820 results. In addition, the temporal index program 816 initiates an environment search of the historical environment database 406 to obtain retrieved environment data 822 (Act 912).

The output program 824 communicates the retrieved search data 818-822 to the information processing system 100 (Act 914). The information processing system 100 may then recreate and render the application state on the display surface 110. However, as noted above, the output program 824 or other logic in the navigation interface system 800, may output all or part of the application history, including the application state, application actions, and environment data.

The action preference settings may be established based on individual or combined operator preferences or profiles. Furthermore, other parameters in the information processing system 100, application history repository 400, application navigation system 600, or navigation interface system 800 may be established or modified depending on the particular operator or operators working with the application. For example, each operator (or group of operators) may specify which actions will be considered application actions for that operator (or group of operators). To that end, the memory 442 may include multiple sets of preference data, established on the basis of individual operators or groups of operators. Other examples of parameters which may vary depending on operator profile include: the amount, type, and time span of environment data played back for each application action, the rate at which historical application actions are displayed and/or applied to reach a specified prior or future application state, and the threshold for determining when an application state record matches a specified temporal selection (e.g., an application state record 422 with a timestamp 426 within 12 hours of the specified temporal selection will be considered a match).

Operator profiles may be considered a specific example of user profiles. A user profile may establish system configuration parameters for an individual in a management role, supervisory role, operator role, or any other role. The systems 100 and/or 600 may then provide historical application navigation responsive to the user profile. For example, an individual in a management role may request application navigation. The systems 100 and/or 600 may then filter historical application data according to the profile established for the management individual.

Figure 10:
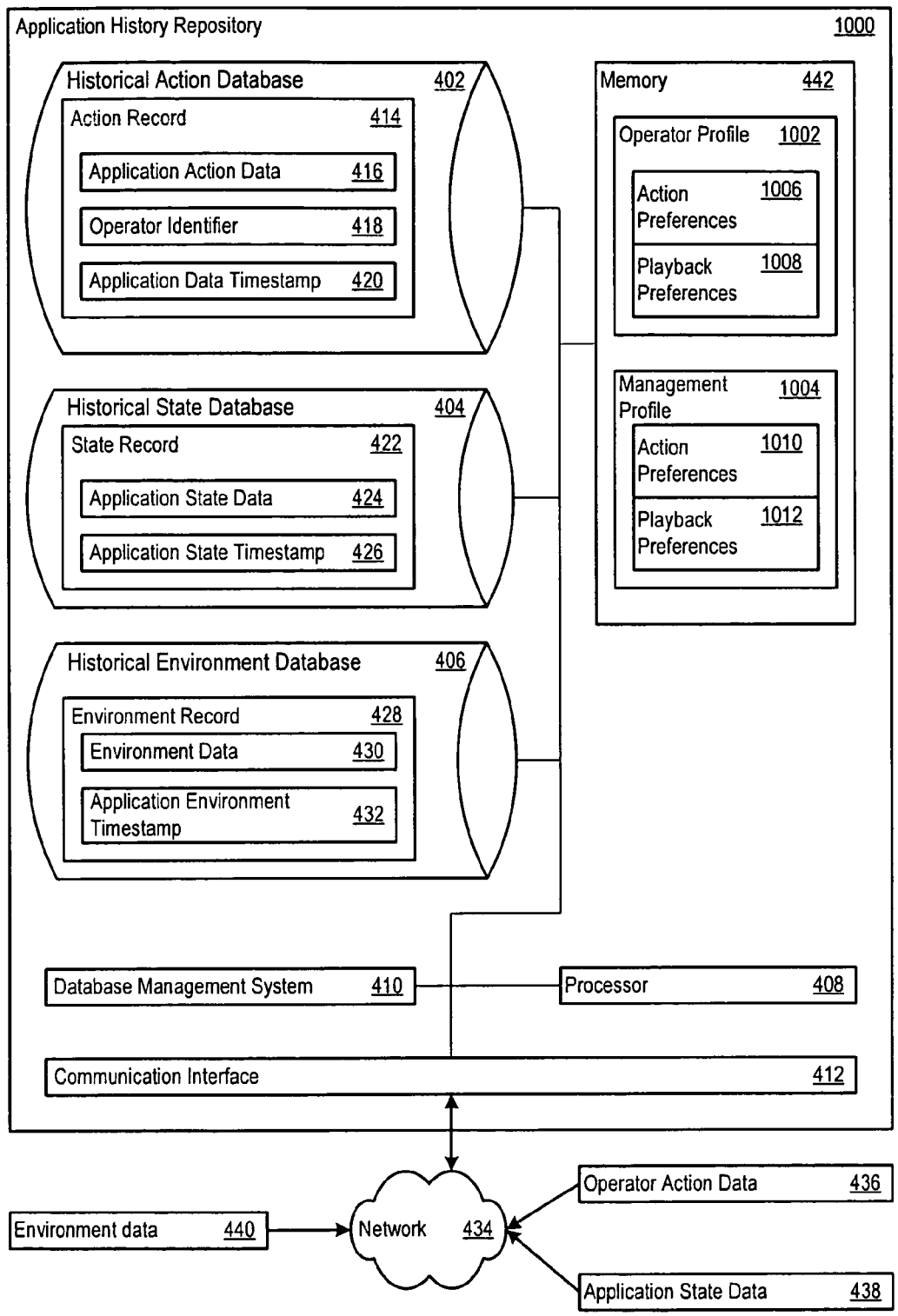
FIG. 10 shows an application history repository which may provide historical application state data, application action data, and environment data to the information processing system shown in FIG. 1.

FIG. 10 shows a second example of an application history repository 1000. The memory 442 in the repository 1000 stores an operator profile 1002 and a management profile 1004. The operator profile 1002 includes action preferences 1006 and playback preferences 1008. Similarly, the management profile includes action preferences 1010 and playback preferences 1012. While the profiles 1002 and 1004 are shown in the repository 1000, the profiles 1002 and 1004 may be established or maintained in whole or in part in other systems, including the information processing system 100.

The action preferences 1006, 1010 may specify the application actions (e.g., as noted above with regard to the preference settings 444-454) which will be recorded for a particular type of user (e.g., an operator or a management individual) responsible for the application action. The playback preferences 1008, 1012 may specify which application actions and/or or environment data are to be provided when a particular type of user initiates an application navigation. Additional preferences may be established to govern the behavior of any other aspect of the systems 100 and/or 600 with respect to any particular type of user. As an additional example, the preferences may specify the level of historical detail to provide based on the time, time or review, or other context of a requested application navigation. As examples, the preferences may specify a very detailed level of review in which each application action and all available environment data are played back, a summary review which in which only application actions are played back, or may specify any other level of review.

The application navigation technology may be used in conjunction with techniques for determining positions of multiple targets on a planar surface as described below in conjunction with a multi-target detector system. These techniques may be used to distinguish and identify inputs (e.g., touch, pen, or other inputs) on the display surface 110 to accurately detect operator inputs. The navigation system 600 may then respond to the inputs by navigating the operator through application state and interaction history as described above. Alternatively or additionally, the navigation system 600 may use the multi-target detector system discussed below to distinguish and identify inputs to the display surface 110 in order to help resolve and specify application actions taken by an operator.

There are a variety of applications for a multi-target detector system. For instance, in a command center where a large interactive map (or other data) is displaying real-time information, multiple users may want to work with the map at the same time, selecting objects on its surface. Prior camera-based target systems, limited to detecting single targets (such as a single touch, pen, or the like), required each user to take turns touching the screen in order to properly detect the user's single touch. With additional touch inputs, prior systems may have undefined or undesirable effects. By contrast, the system described below is not so limited. A single user, or multiple users, may touch the screen multiple times, and the location of the touches may be detected properly even with a camera-based touch system.

Consumer applications for the multi-target detector system include, for example, a public kiosk in a movie theater lobby that displays information about currently showing movies, in a tabular format some yards wide—a sort of digital billboard. Multiple, independent users may walk up and browse this information simultaneously. The multi-target detector system allows the touchable computed area to be treated as an active surface available to all users, a surface not requiring users to acquire an input channel, such as a mouse or a pointing tool, in order to use it. The multi-target detector system thereby supports a new class of valuable multi-user applications.

Figure 11:
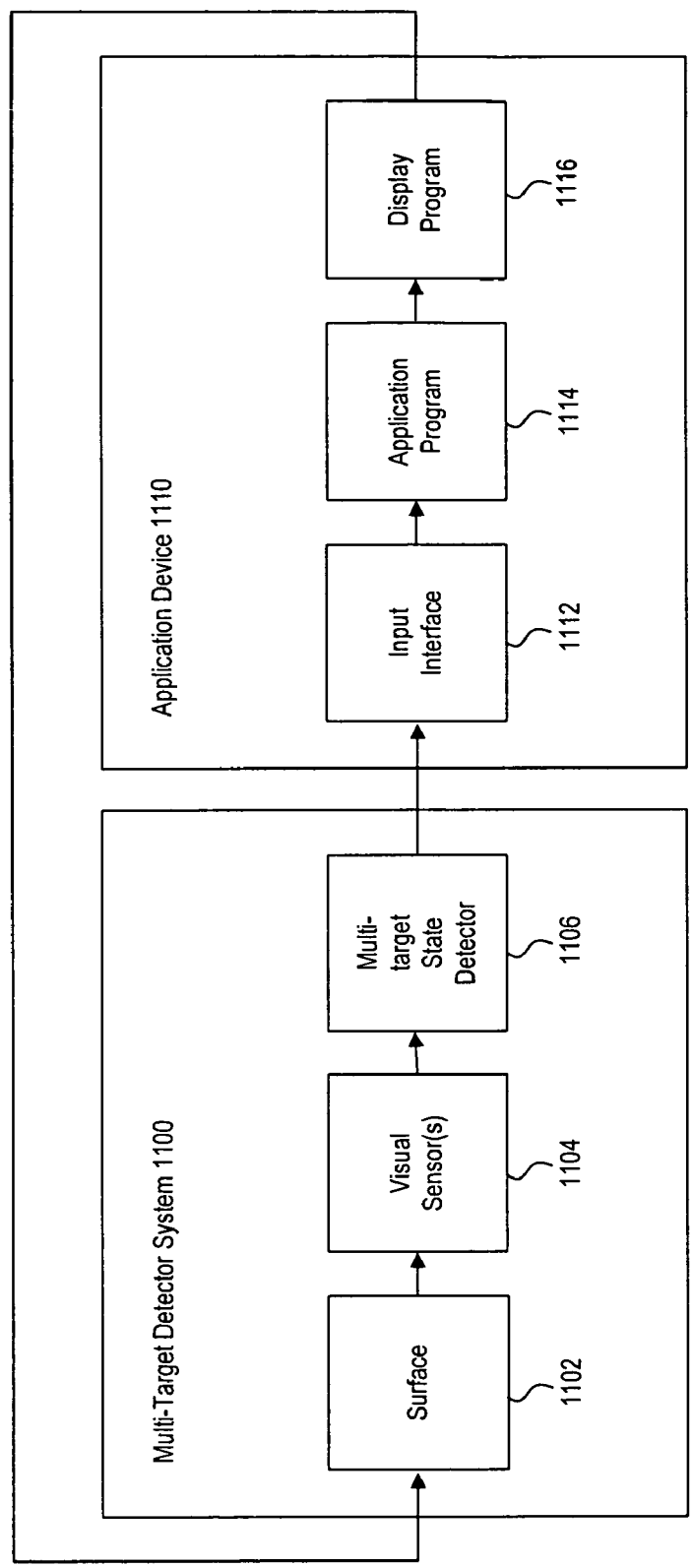
FIG. 11 shows a configuration of a multi-target detector system interfacing with an application device.

FIG. 11 shows a configuration of a multi-target detector system 1100 interfacing with an application device 1110. The multi-target detector system 1100 may provide data indicative of a single location or multiple locations for targets where a user has (or users have) touched a surface 1102. The surface 1102 may be flat or substantially flat. The flat surface 1102 may be composed of clear plastic or glass, and may abut a single or a series of display screens (such as LCD display screens). Or, the flat surface 1102 may be coated on one side, with the display being projected onto one side of the surface 1102. The surface 1102 may be the display surface 1102, with images displayed with one or more display devices 112 under control of the system for distributed information processing and interaction 100.

The multi-target detector system 1100 may further include one or more visual sensors 1104. The visual sensors 1104 may comprise cameras, such as CCD-based cameras or other image-acquisition devices. The CCD-based cameras may capture electromagnetic information, such as from the visible and/or infrared spectra. An example of a CCD camera is Lumenera Lu275. The image captured by the CCD-based cameras may be single images in any suitable format including digital formats such as jpeg (referring to a standard data format advanced by the Joint Photographic Experts Group) or gif (Graphics Interchange Format), or other, or the video images may be a motion picture image, such as a data file encoded according to a standard such as that proposed by the Motion Picture Experts Group (MPEG or one of its variants) or other standard. Other visual sensors 1104 may include infrared sensors, which may be any sensing device that responds to heat, energy or radio emissions from a device to produce an image.

One example of a configuration of the multi-target detector system 1100 comprises two or more cameras that look along the viewing surface 1102, with the cameras' fields of view parallel to that surface 1102. An exemplary camera-based system is disclosed in U.S. Patent Application No. 2005/0077452A1 (U.S. application Ser. No. 10/312,983), published on Apr. 14, 2005, which is incorporated by reference. A section of black tape may be placed along the bottom and sides of the surface 1102 so that, without any touch present, the portion of the camera that senses the image near the surface 1102 is black. In effect, the camera may "see" only a black strip when no touch is present. When a target such as a user's finger or elbow, a pen, or the like is proximate to, or touches, the surface 1102, the finger, viewed against the black tape registers a change or an occlusion in the field of view of the camera, which may be subsequently processed. For example, the occlusion may comprise a bright spot within the field of view within the camera. Thus, the cameras may acquire images of the multiple simultaneous targets on the planar surface 1102.

The information from the cameras may be sent to the multi-target state detector 1106. The multi-target state detector 1106 therefore is configured to receive signals from the visual sensors 1104 and provide any necessary signals in return. For example, for receiving a jpeg format file from a camera, the multi-target state detector 1106 receives a jpeg formatted file from the camera and stores the file, providing appropriate network handshaking signals to the camera. In another example, the format maybe streamed data from another camera. In either case, the format may comprise data indicative of the images of the multiple simultaneous targets on the surface 1102.

As discussed more fully below, the multi-target state detector 1106 may sense the state of a single target on the surface 1102 or the states of multiple targets on the surface 1102. As discussed above, a target may comprise a finger, a pen, or other object that is proximate to or touches the planar surface 1102. The state of the target may comprise any characteristic of the target, such as position of the target, size of the target, or movement of the target (e.g., general movement (up, down, left, right) or speed).

The states of the targets may be sent to an application device 1110 for processing. The application device 1110 may include an input interface 1112 that receives the determined states of the targets from the multi-target state detector 1106. Further, application program 1114 may use the states of the targets as inputs for control or historical navigation of the program. The application program may then send its output to a display program 1116. For example, the display program 1116 may display onto the surface 1102 an image or other rendering. The image displayed may include a single image or a series of image tiles of a tiled output display, as discussed above. Thus, the multi-target detector system 1100 may detect position and movement of a user's hand and, in conjunction with the application device 1110, indicate the position and motion of the user's hand. For example, if the hand motion should be interpreted as a left click, right click or other mouse actuation of the display on the surface 1102, the application device 1110 will respond appropriately by processing the hand motion and, if appropriate, reflecting the hand motion in the display portion controlled.

Figure 12:
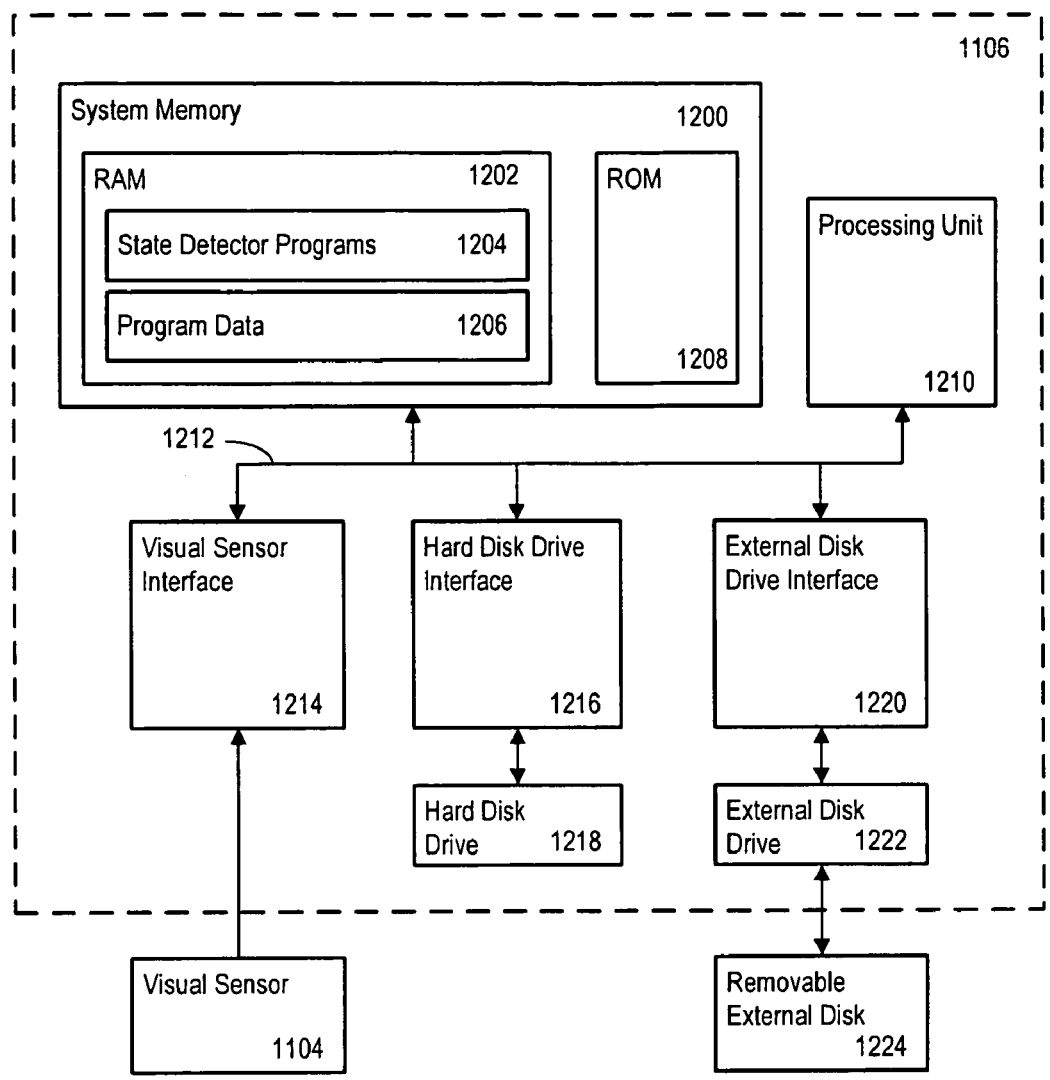
FIG. 12 shows an expanded block diagram of the multi-target state detector shown in FIG. 11.

FIG. 12 shows an expanded block diagram of the multi-target state detector 1106. Multi-target state detector 1106 may comprise a general purpose computing device, including a processing unit 1210, a system memory 1200, and a system bus 1212 that couples various system components including the system memory 1200 to the processing unit 1210. The processing unit 1210 may perform arithmetic, logic and/or control operations by accessing system memory 1200. The system memory 1200 may store information and/or instructions for use in combination with processing unit 1210. The system memory 1200 may include volatile and non-volatile memory, such as random access memory (RAM) 1202 and read only memory (ROM) 1208. RAM 1202 may include state detector programs 1204, which may include computer-readable programming corresponding to the flow charts in FIGS. 13-14, 20-21, and 22-23. Further, RAM 1202 may include program data 1206, such as data used to execute the state detector programs 1204. A basic input/output system (BIOS) may be stored in ROM 1208. The system bus 1212 may be any of several types of bus structures including a memory bus or memory controller, a peripheral bus, and a local bus using any of a variety of bus architectures.

Multi-target state detector 1106 may receive input from visual sensor(s) 1104 via a visual sensor interface 1214. As discussed in more detail below, the input from the visual sensor interface 1214 may comprise data such as that shown in FIG. 19. Multi-target state detector 1106 may further include a hard disk drive 1218 for data storage, and an external disk drive 1222 for reading from or writing to a removable external disk 1224. The removable disk may be a magnetic disk for a magnetic disk driver or an optical disk such as a CD ROM for an optical disk drive. The hard disk drive 1218 and external disk drive 1222 may be connected to the system bus 1212 by a hard disk drive interface 1216 and an external disk drive interface 1220, respectively. The drives and their associated computer-readable media provide nonvolatile storage of computer readable instructions, data structures, program modules and other data for the multi-target state detector 1106. Other types of computer readable media which can store data that is accessible by a computer, such as magnetic cassettes, flash memory cards, random access memories, read only memories, and the like, may also be used. Though FIG. 12 depicts RAM 1202 as storing the state detector programs 1204, any one of, any combination of, or all of the hard disk 1218, external disk 1224, ROM 1208 or RAM 1202 may store the state detector programs 1204.

The system may track multiple targets at the same time. Initially, there may be no targets registered in the system. When new targets arrive, the targets may be added one at a time to a list of known, active targets, and tracked independently of other pre-existing targets. The multi-target detector system 1100 may notify, either constantly or periodically, any connected client software, such as application device 1110, of the state of all tracked targets. The application device 1110 may comprise any program adapted to accept such state information, such as, for example, a command center or movie kiosk application program. Given the state information, developers of application programs are allowed to provide software behaviors that reflect these multiple input streams, such as moving two objects independently, on different parts of the screen, based on independent user inputs.

In one aspect of the invention, the multi-target detector system 1100 first determines potential positions. The potential positions may include both positions corresponding to "real" targets (e.g., targets corresponding to an actual touch) and positions corresponding to "ghost" targets (e.g., targets not corresponding to actual targets). The potential positions are then analyzed to determine which are positions corresponding to "real" targets and which are positions corresponding to "ghost" targets.

Figure 13:
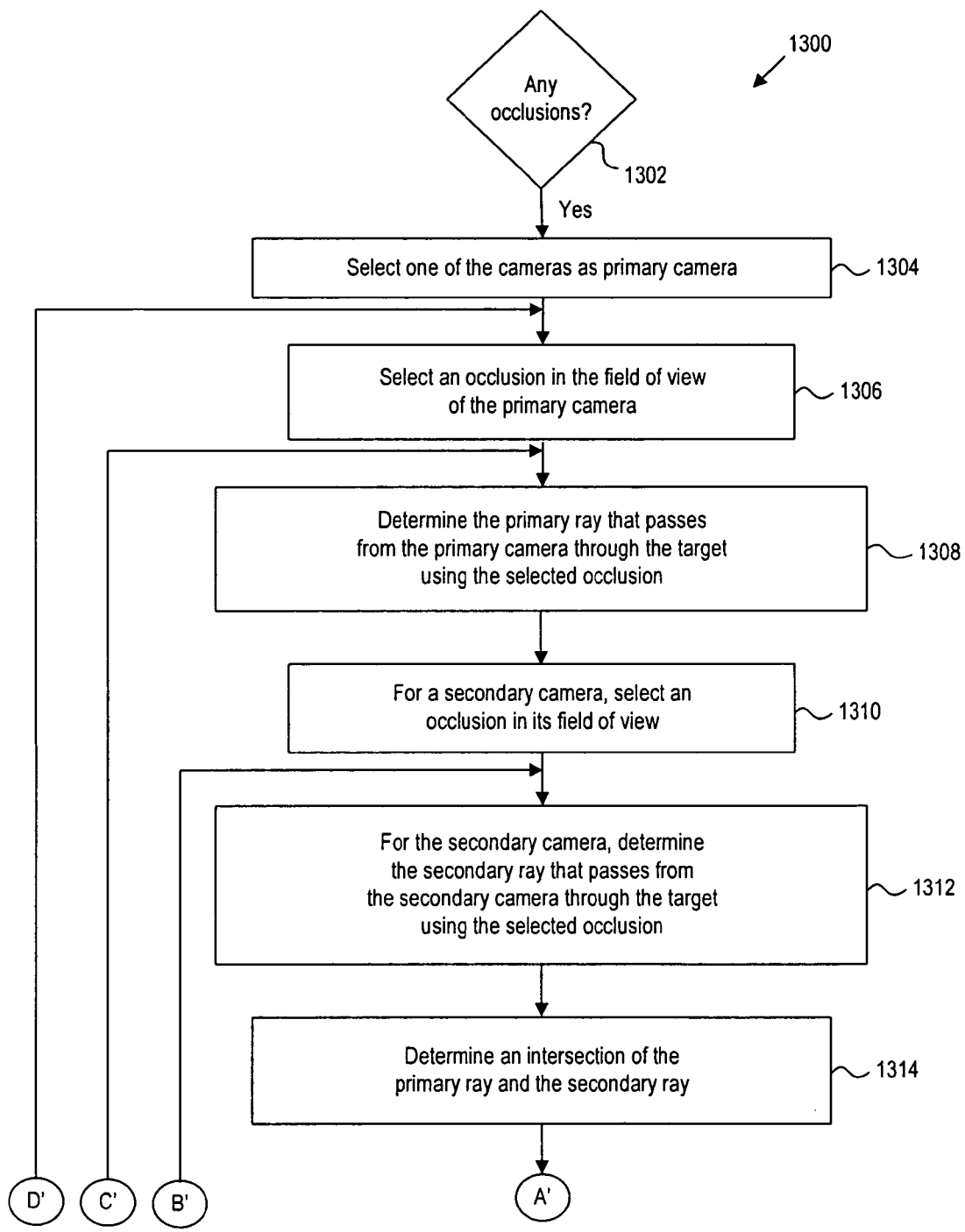
FIG. 13 shows acts which the multi-target state detector may take to determine potential target positions.
Figure 14:
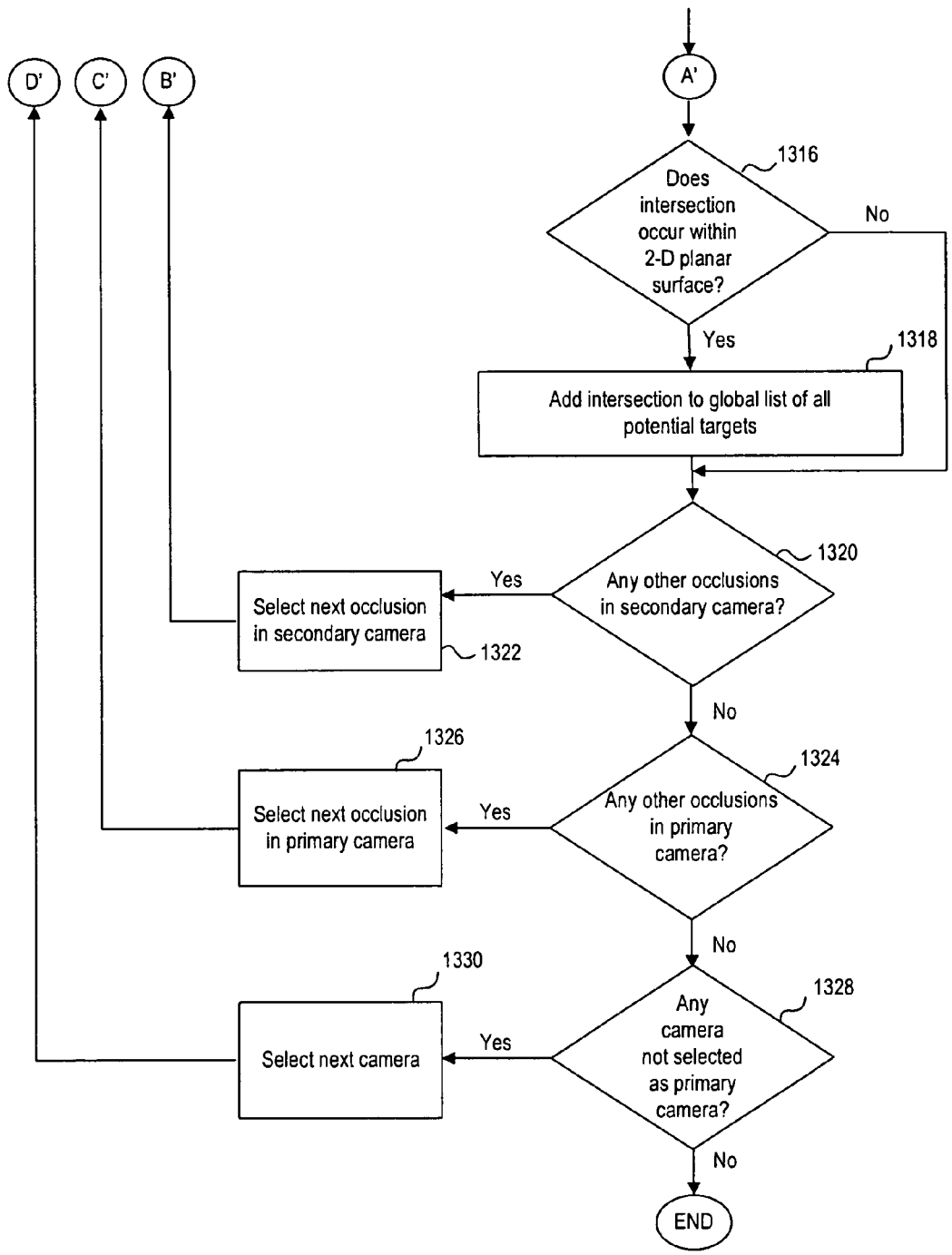
FIG. 14 continues the flow diagram shown in FIG. 13 and shows acts which the multi-target state detector may take to determine the potential target positions.

FIGS. 13 and 14 show acts 1300 which the multi-target state detector 1106 may take to determine the potential positions, as well as whether the potential positions correspond to "real" or "ghost" targets. The multi-target state detector 1106 determines whether there are any occlusions (Act 1302). Act 1302 may be performed for every frame of information received from the cameras, or may be performed after a group of frames are received. As discussed above, an occlusion may be any variation in the field of view of the camera. For example, an occlusion may comprise a section in the field of view that is brighter than an adjacent section. The occlusion may thus register if a target is present in the image acquired by the cameras. If an occlusion is present, one of the cameras is selected as the primary camera (Act 1304). For example, the visual sensor(s) 1104 may comprise two cameras, camera A and camera B. Camera A may first be designated as the primary camera. For the primary camera selected, one of the occlusions in its field of view is selected (Act 1306). Using the occlusion, the ray, which may be designated the primary ray, is determined that passes from the camera through the position of the target (Act 1308).

Figure 15:
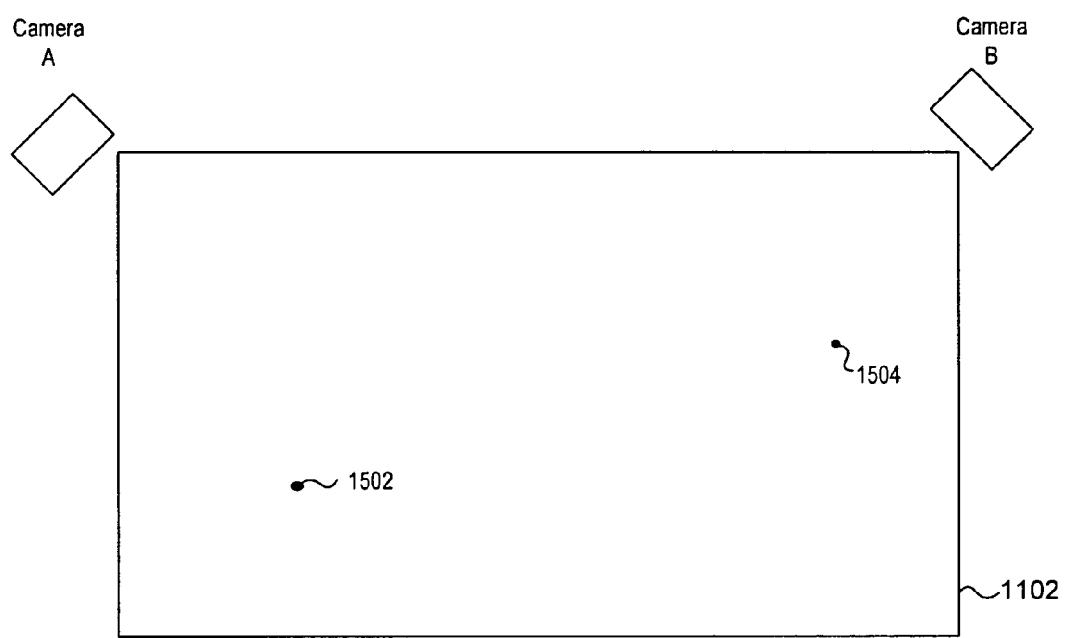
FIG. 15 is a schematic showing two targets on a planar surface.
Figure 19:
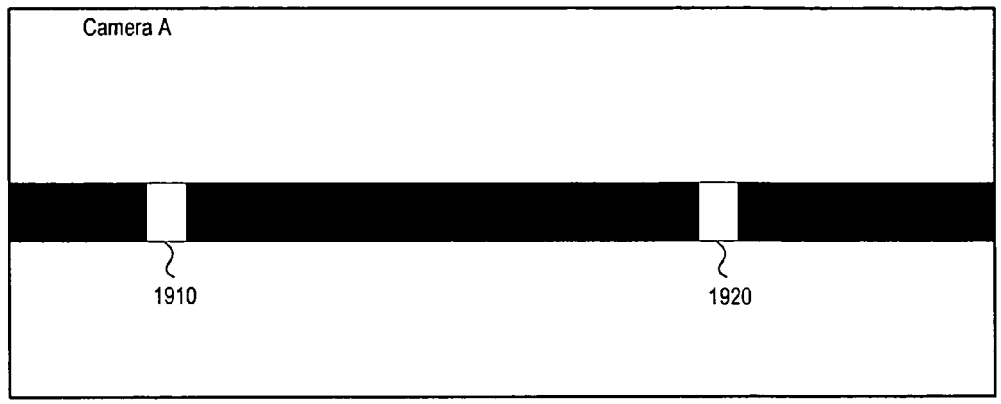
FIG. 19 shows schematics of sensory information produced from the two cameras shown in FIG. 15, including multiple occlusions, for the two targets depicted in FIG. 15.
Figure 19:
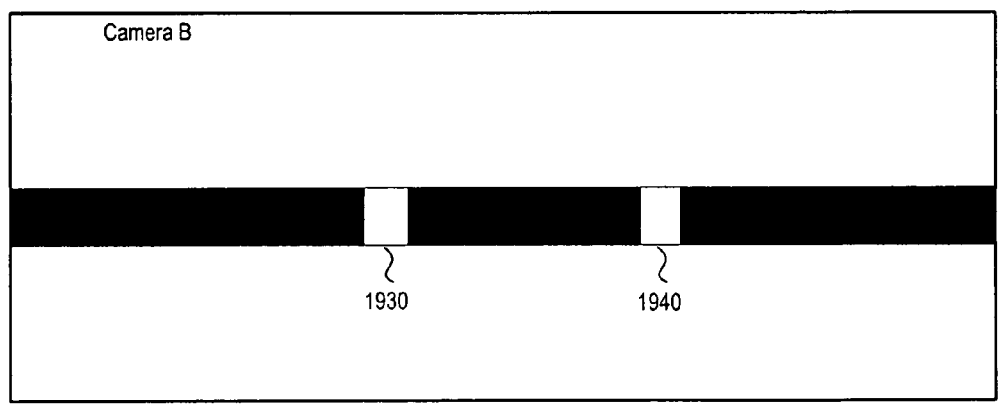

FIG. 15 shows an example of Camera A and Camera B, and two targets 1502, 1504 on the planar surface 1102. As discussed above, Camera A registers the occlusions. The occlusions may register as bright spots 1910, 1920 in the field of view of Camera A, as shown in FIG. 19. The occlusions 1910, 1920 are indicative of two targets 1502, 1504. Because Camera A provides no depth information (i.e., how far the touch or target is from the camera), Camera B provides additional information used to triangulate the position, as discussed in more detail below. Similarly, Camera B may register occlusions 1930 and 1940, such as shown in FIG. 19. The occlusions 1930, 1940 are indicative of the targets 1502, 1504. Camera A and Camera B are positioned so that each field of view extends beyond the peripheral edge of the planar surface 1102. In this way, the entire planar surface 1102 is within the fields of view of Camera A and Camera B.

FIG. 19 illustrates one frame of data provided by the cameras. In one embodiment, the cameras may be programmed to transfer data at approximately 135 frames/second. The frames may be sent sequentially so that the cameras provide sequential image information. Commercially available camera-based touchable displays typically operate at a much slower frame rate, such as on the order of 30 frames/second. The increase in the frame rate may allow better determination of targets on the surface 1102. For example, analysis of targets in previous frames allows potentially better determination of a current frame's targets, as discussed in more detail below. Only a portion of the camera's output is required to be sent to the multi-target state detector 1106 for processing, as shown in FIG. 19. Therefore, the camera may be programmed to transmit only a narrow band of data required for processing, as shown in FIG. 19. This may allow the cameras to increase the frame rate transmitted.

Using the occlusion from Camera A, a ray may be calculated that is indicative of passing through a potential target. For example, one of the occlusions, as shown in FIG. 19, is 1910. Using a look-up table, the occlusion may be correlated to ray 1602, shown in FIG. 16. For example, the output of CCD camera shown in FIG. 19 may include a set of pixels, such as 1 to 1,600, corresponding to the image captured. If pixel number 1350 in a CCD camera is above a predetermined brightness, indicating an occlusion, the look-up table may be accessed to determine the ray correlated to pixel number 1350. The ray may be represented in a variety of ways, such as using two points along the ray (x1, y1; x2, y2) or a point along the ray and a slope (x, y; m).

The look-up table may be generated at any time during operation, such as during an initialization process. For example, when the visual sensor 1104 is a CCD camera, the pixels generated by the camera may be correlated to a particular ray. As shown in FIG. 19, the narrow band of data transmitted may correspond to a discrete number of pixels, such as 1600 pixels. Each of the pixels, or groups of pixels, may be assigned to a ray. In order to compile the look-up table during initialization, various pre-determined points on the planar surface 1102 may be touched (such as by pasting a white object to a point on the planar surface 1102). The corresponding pixels that light up may then be recorded, and assigned to the pre-determined points on the planar surface 1102. Using this data, the rays corresponding to each pixel or a group of pixels may be determined. If the cameras shift relative to the screen, the system may need to be re-initialized or calibrated in the manner as noted above.

Figure 16:
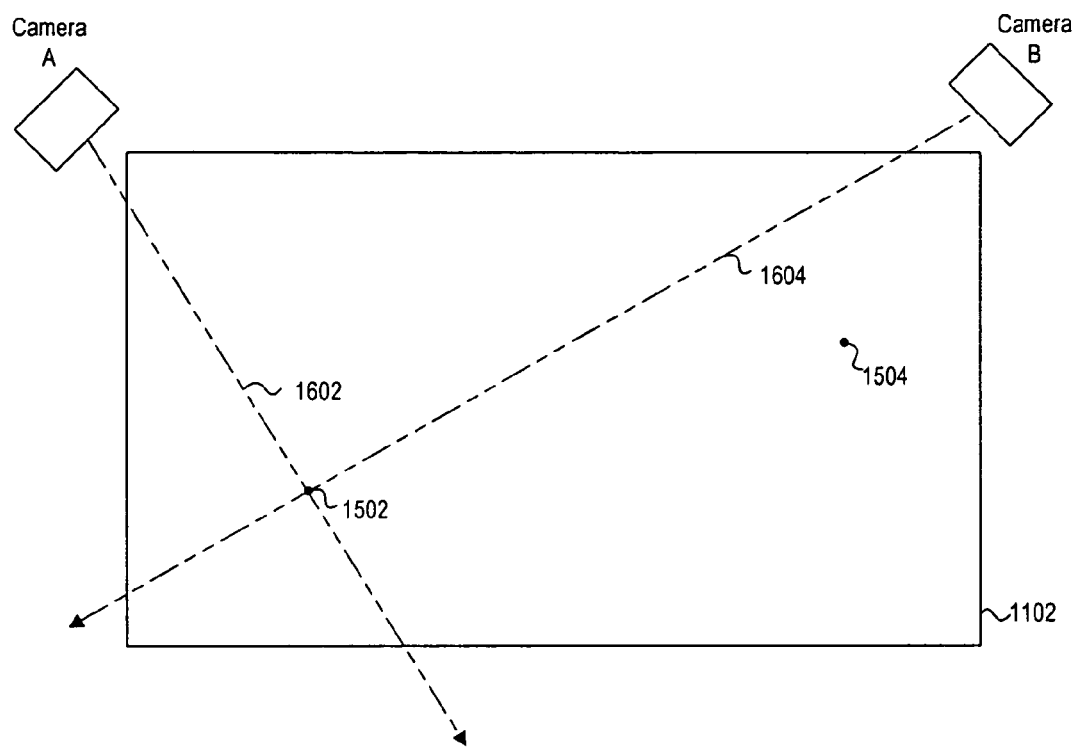
FIG. 16 is a schematic showing the two targets depicted in FIG. 15 and rays determined for a first set of occlusions.
Figure 17:
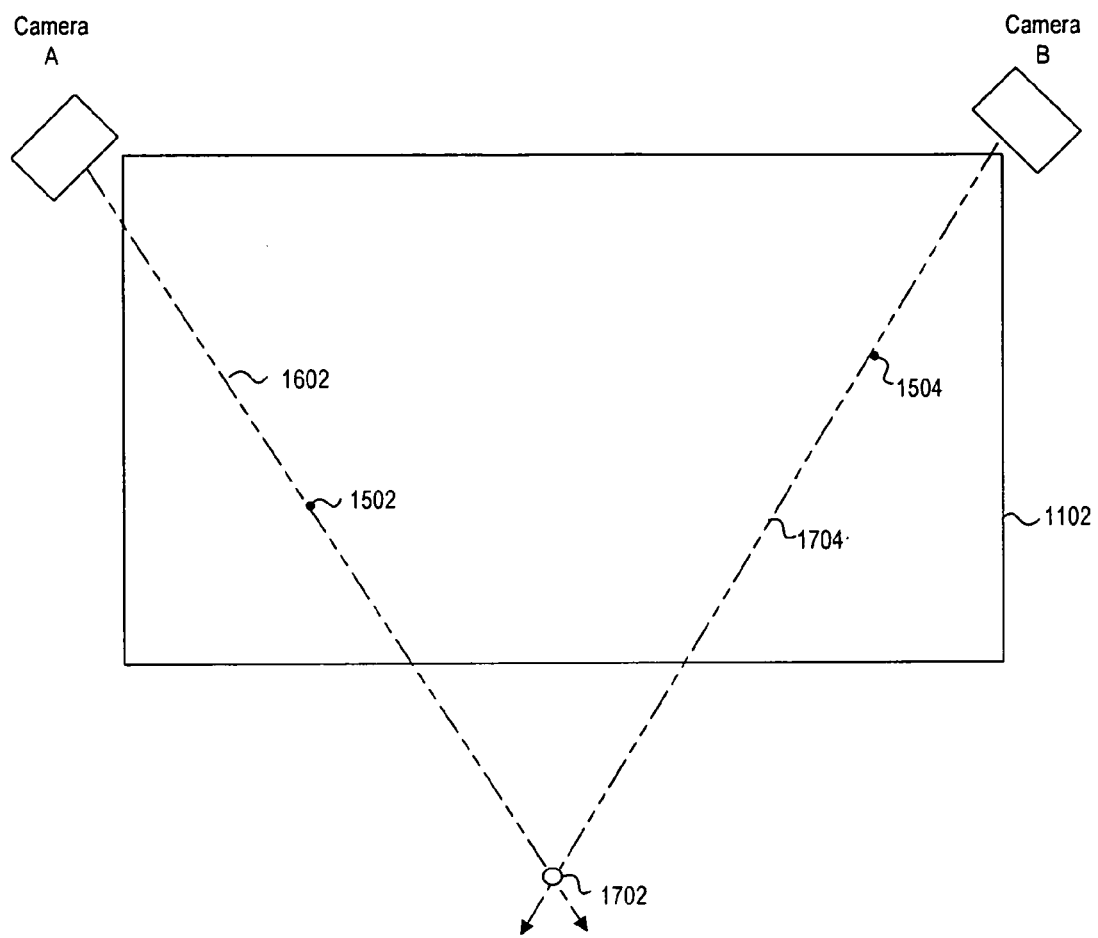
FIG. 17 is a schematic showing the two targets depicted in FIG. 15 and rays determined for a second set of occlusions.
Figure 18:
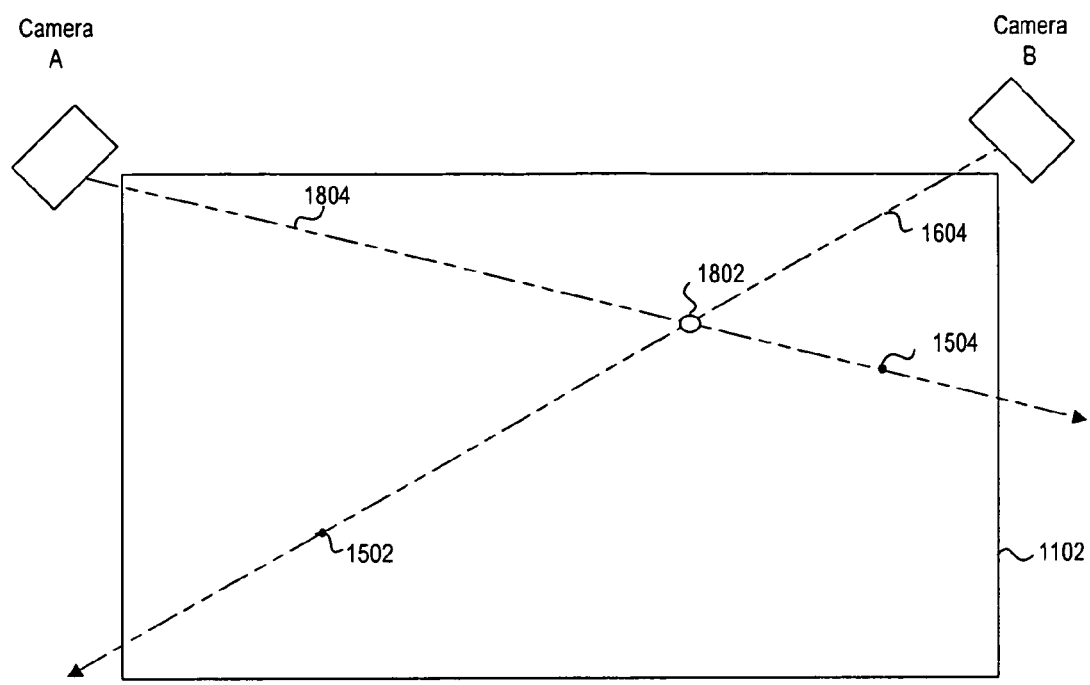
FIG. 18 is a schematic showing the two targets depicted in FIG. 15 and rays determined for a third set of occlusions.

An occlusion may be selected in the secondary camera, such as Camera B, for analysis (Act 1310). For example, occlusion 1930 may be selected. For the secondary camera, using the occlusion from Camera B, a ray may be calculated that is indicative of passing through a potential touch (Act 1312). For occlusion 1930, ray 1604 passes through touch 1502. The intersection of the two rays (primary ray and second ray) is calculated (Act 1314). The intersection may be calculated by mathematically determining, for the two rays, whether there is an intersection point. The intersection point (1502) is considered the potential position. Subsequent analysis determines whether the potential position is a position for a "real" target or a position for a "ghost" target. In the case of FIG. 16, the subsequent analysis will determine that the potential position is a position for a "real" target. In the case of two real targets, there are four potential positions generated, two positions corresponding to "real" targets and two positions corresponding to "ghost" targets. As shown in FIGS. 15 and 16, the two "real" targets are 1502 and 1504. The two "ghost" targets are shown in FIGS. 17 and 18 as 1702 and 1802. The system may also determine the positions for more than two real targets, such as three, four, five, or six real targets.

There are several ways to determine whether a potential position is a position for "real" or "ghost" target, as shown in FIG. 14, which continues the flow diagram started in FIG. 13. One way is to determine whether the potential position is within the boundary of the planar surface 1102 (Act 1316). If the intersection point is within the bounds, the intersection may be a position corresponding to a real target. Therefore, the intersection point is added to a global list of all possible targets (Act 1318). The global list of targets is subject to further analysis, as discussed below with reference to FIGS. 20-21 and FIGS. 22-22. In FIG. 16, the intersection point of rays 1602 and 1604 occurs at target 1502, which is within the bounds of the planar surface 1102. Therefore, the potential position is added to the global list of all potential targets.

The multi-target state detector 1106 then determines whether there are any other bright spots in the field of view of the secondary camera (Act 1320). In FIG. 19, for example, there is one more occlusion 1940. Therefore, the next spot is selected (Act 1322). FIG. 17 shows a schematic of the determination of the rays and the intersection point for occlusion 1910 for Camera A and occlusion 1940 for Camera B. As discussed above, ray 1602 is the ray that corresponds to occlusion 1910. Ray 1704 is the ray that corresponds to occlusion 1940. FIG. 17 shows the intersection point of the two rays, which may be mathematically calculated as discussed above. The intersection point, designated as 1702 in FIG. 17, is outside the bounds of the planar surface 1102. Therefore, in accordance with Act 1316, the intersection point is deemed not to be a position corresponding to a "real" target and will not be added to the global list for further analysis.

The output from the primary camera is then analyzed to determine if there are any other occlusions (Act 1324). If so, the next occlusion is selected (Act 1326), and the process is repeated. For example, FIG. 18 shows the determination of the rays for a second occlusion 1920 from Camera A. The second occlusion corresponds to ray 1804. As discussed above, occlusion 1930 corresponds to ray 1604. The two rays result in an intersection point 1802. Intersection point 1802 is within the bounds of the planar surface 1102 and is therefore added to the global list of possible targets according to Act 1318. However, the intersection point corresponds to a "ghost" target because it does not correspond to the presence of a physical target at that intersection point. Subsequent processing, discussed in FIGS. 20 and 21, further analyzes whether the potential positions correspond to a "real" target or a "ghost" target.

After all of the occlusions of Camera B are analyzed, other cameras may be analyzed. For example, if a third camera, such as Camera C, is used, the methodology may iterate through similar analysis with Camera A selected as the primary camera and Camera C selected as the secondary camera. After all of the secondary cameras are analyzed, it is determined whether any camera has not been selected as the primary camera (Act 1328). For example, if Camera B has not been selected as the primary camera, it is selected (Act 1330), and the process is repeated. In this manner, all of the potential positions may be determined.

The list of potential positions may be analyzed to determine which are positions corresponding to "real" targets and which are positions corresponding to "ghost" targets. As discussed above, the analysis may be based on a variety of factors. For example, the determination as to whether a potential position corresponds to a "real" target may be based on the history, including the position and/or speed history, of a previous target. In one aspect, the history may be compiled one target at a time, whereby only one additional target may be added to the history in a current frame of processing. In this manner, the system first sees no targets on the planar surface 1102, then one target on the surface 1102, and then multiple targets on the surface 1102. Using this sequence, when more than one target is seen on the surface 1102, the history (which includes at least one target) may be used to detect the multiple targets currently on the planar surface 1102, as discussed in more detail below.

FIGS. 20-21 and FIGS. 22-23 show acts 2000 and 2200 which the multi-target state detector 1106 may take to determine which of the current potential positions correspond to real targets, as well as to determining state information for the real targets. In general, the multi-target state dector 1106 compiles a list of real targets. The list may be cleared at the beginning of each analysis (such as after each frame is received). Through analysis of various aspects of the previous target (including the previous target's position and current expected position), the potential positions may be added to the list. For example, the previous target may be compared with the potential position (corresponding to a potential target in the current frame) in a variety of ways. Specifically, the distance between the position of a previous target and the potential position. As another example, the position of a previous target extrapolated to the current frame may be compared with the potential position. As still another example, rays formed between the position of the previous target and potential position may be analyzed. Further, an expected position of a touch may be compared with the potential positions to determine which potential position corresponds to a "real" target. For example, if a certain section of the surface 1102 is expected to have a touch (such as a pop-up box requesting selection of "open," "cancel," etc.), the sections of the surface 1102 may be compared with the potential positions. If the potential position is within one of the sections of the surface 1102 expected to have a touch, the potential position may be deemed to correspond to a "real" target; otherwise, the potential position may be determined to correspond to a "ghost" target. For this analysis, the multi-target state detector 1106 may receive information from the application program 1114 which indicates which sections of the surface 1102 are expected to have a touch.

Figure 20:
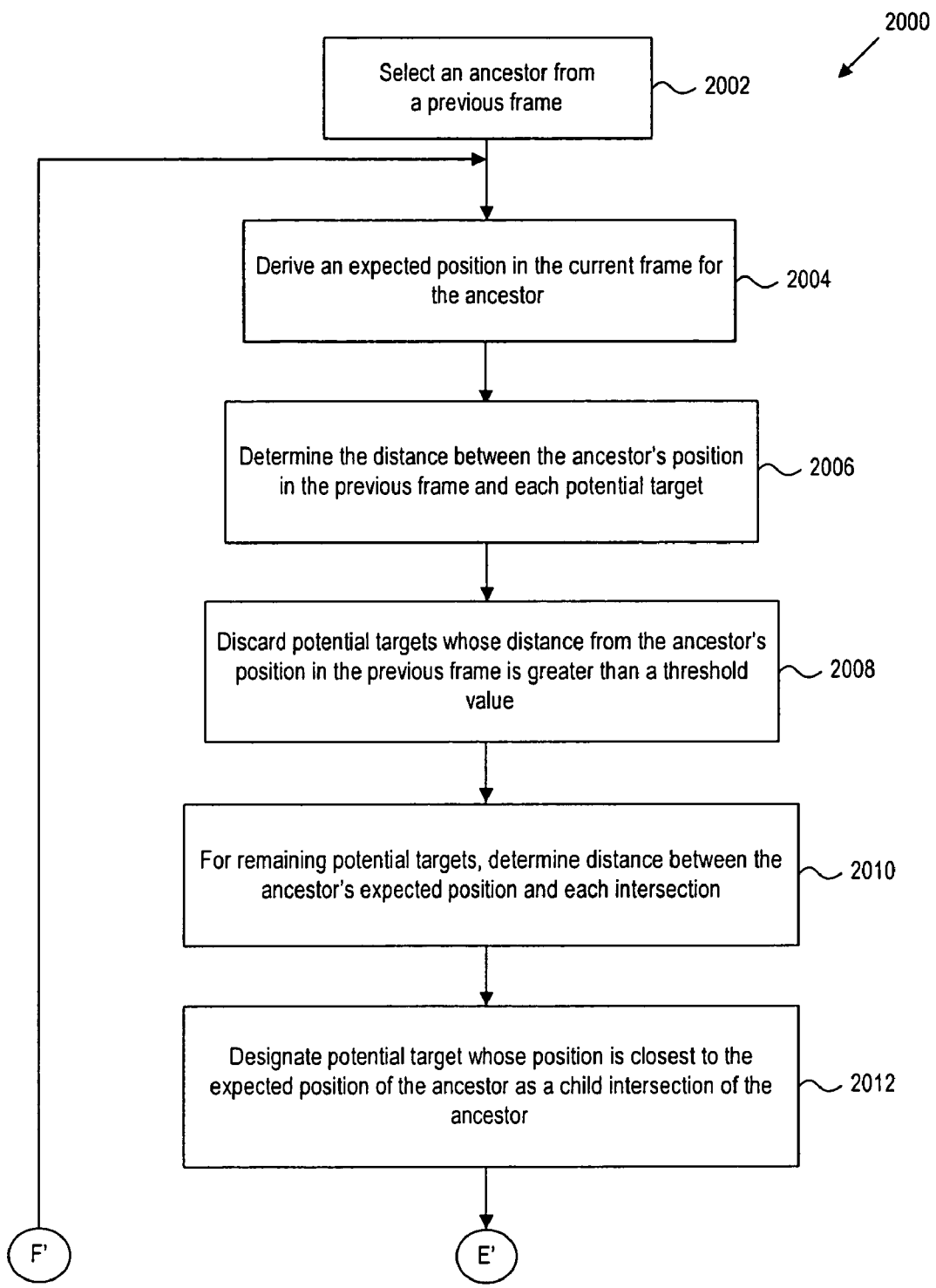
FIG. 20 shows acts which the multi-target state detector may take to narrow the list of possible targets.
Figure 21:
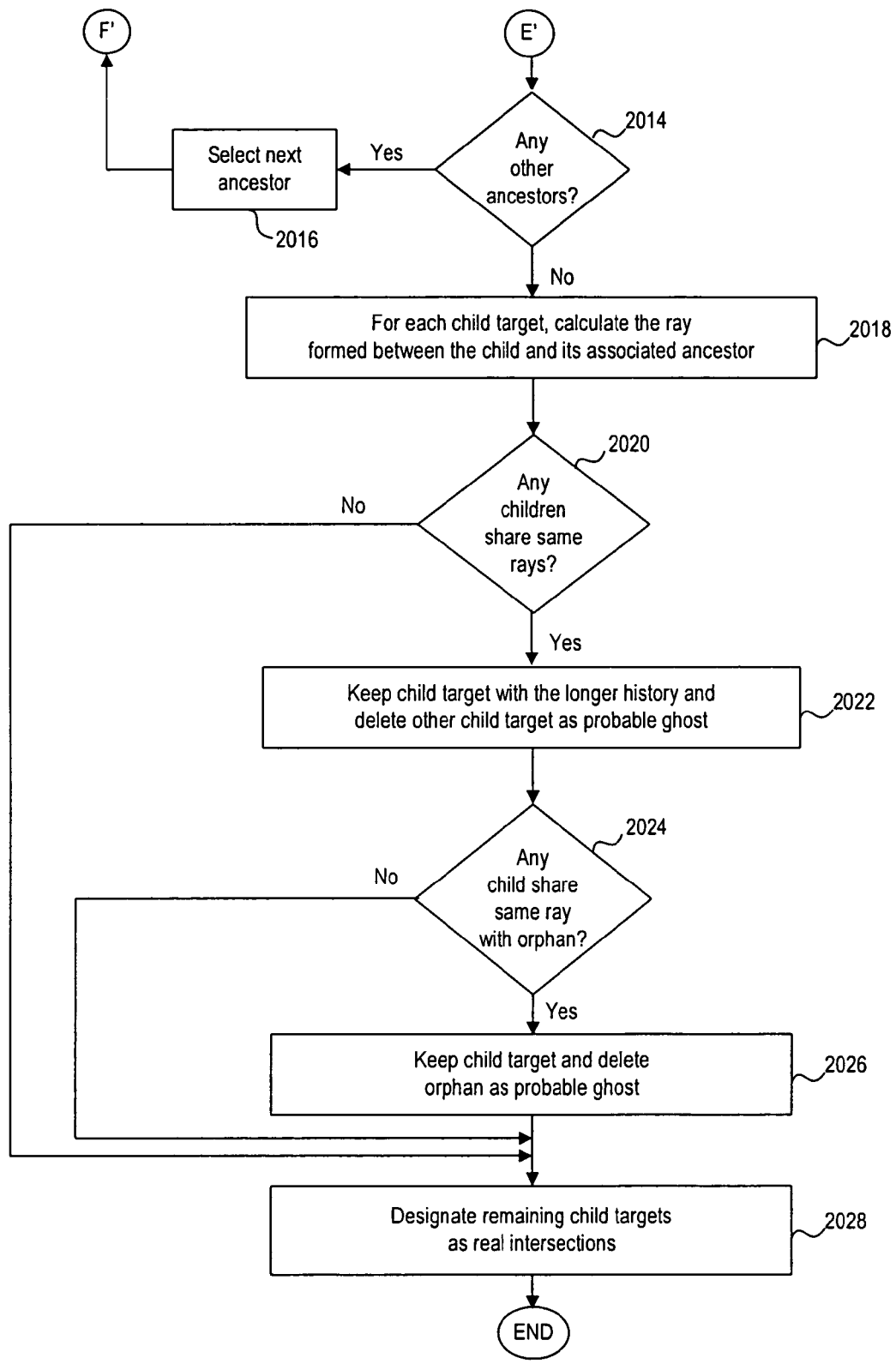
FIG. 21 continues the flow diagram shown in FIG. 20 and shows further acts which the multi-target state detector may take to narrow the list of possible targets.

FIGS. 20 and 21, for example, show acts 2000 which the multi-target state detector 1106 may take to analyze the potential positions. To analyze the potential positions, the potential positions (which correspond to potential targets in the current frame) are analyzed to determine whether one or some of potential targets are "related" or correspond to previous targets. For example, the potential targets and previous targets may be deemed to be "related" by an "ancestor-child" relationship. An "ancestor target" describes intersections that corresponded to a real target in a previous processing cycle, such as the last camera frame. A "child target" describes a target in the current frame that is "related," such as a being a continuation of the previous target into the current frame. An "ancestor target" from a previous frame may be selected (Act 2002). A list of zero or more "ancestor targets" may be compiled and saved from a previous processing cycle, such as the last camera frame. In the new frame currently being processed, one mode of analysis is to determine is whether any of the potential targets in this current frame match up with an "ancestor target" from the last frame. This may indicate that the intersections both refer to a single real target on the 2D plane, even though that target may move from frame to frame. If there is correspondence between targets past and present, one can define an ancestor-child relationship between the two targets.

An expected position may be derived in the current frame for the selected ancestor target (Act 2004). The expected position may be determined in a variety of ways, such as based on the position of the ancestor target and instantaneous velocity of the ancestor target in the previous frame. A distance may be determined between the ancestor target's position in the previous frame and each of the potential positions corresponding to the potential targets (Act 2006). Potential targets may be discarded whose distance from the ancestor target's position in the previous frame is greater than a predetermined threshold (Act 2008). The predetermined threshold may be a function of several variables, such as the framerate of the camera, the resolution of the screen, and/or assumptions of how fast the target will move. For example, if the framerate of the camera is higher, the threshold may be lower. Moreover, if the CCD camera provides pixel information, the threshold may be a function of the real physical resolution of the screen. For instance, if one assumes that a person would move their finger no more than 1 inch per frame (i.e., approximately 1/100th of a second), and the screen has a resolution of 50 pixels/inch, then the threshold would be approximately 50 pixels.

For the non-discarded potential targets, determine the distance between the ancestor target's expected position, according to Act 2004, and each non-discarded possible target (Act 2010). The potential target whose position is closest to the expected position is designated as a child of the ancestor target (Act 2012). This completes and extends the ancestor-child relationship, which may extend over many camera frames. This process is repeated for any other ancestor targets, (Act 2014), with the next ancestor target selected, (Act 2016). (Act 2014 is shown in FIG. 21, which continues the flow diagram started in FIG. 20.)

Further, rays formed between the child target and its associated ancestor target may be calculated (Act 2018). For example, a child target has associated with it a set of coordinates for its potential position, such as xC and yC. Similarly, an ancestor target has associated with it a set of coordinates for its position in a previous frame, such as xA and yA. A ray may be calculated that includes both sets of coordinates (xC, yC; xA, yA). Analysis of the rays may assist in determining whether a potential target is a "real" target. For example, if two child targets share the same rays, the target whose ancestor-child relation goes farther into the past—the child with the longer history—trumps and the other child is deleted as a probable ghost. As another example, if a child target shares any rays with an orphan, which may be a new intersection point that has not been successfully matched with any ancestors, the child target trumps and the orphan may be deleted as a ghost.

The multi-target state detector 1106 determines whether any child targets share the same rays (Act 2020). If so, the child target with the longer history is kept on the list and the other child target is deleted as a ghost (Act 2022). Moreover, the multi-target state detector 1106 determines whether any child target shares the same ray with an orphan (Act 2024). If so, the child target is kept on the list and the orphan is deleted as a probable ghost (Act 2026). The remaining child targets are thus designated as "real" intersections (Act 2028).

Figure 22:
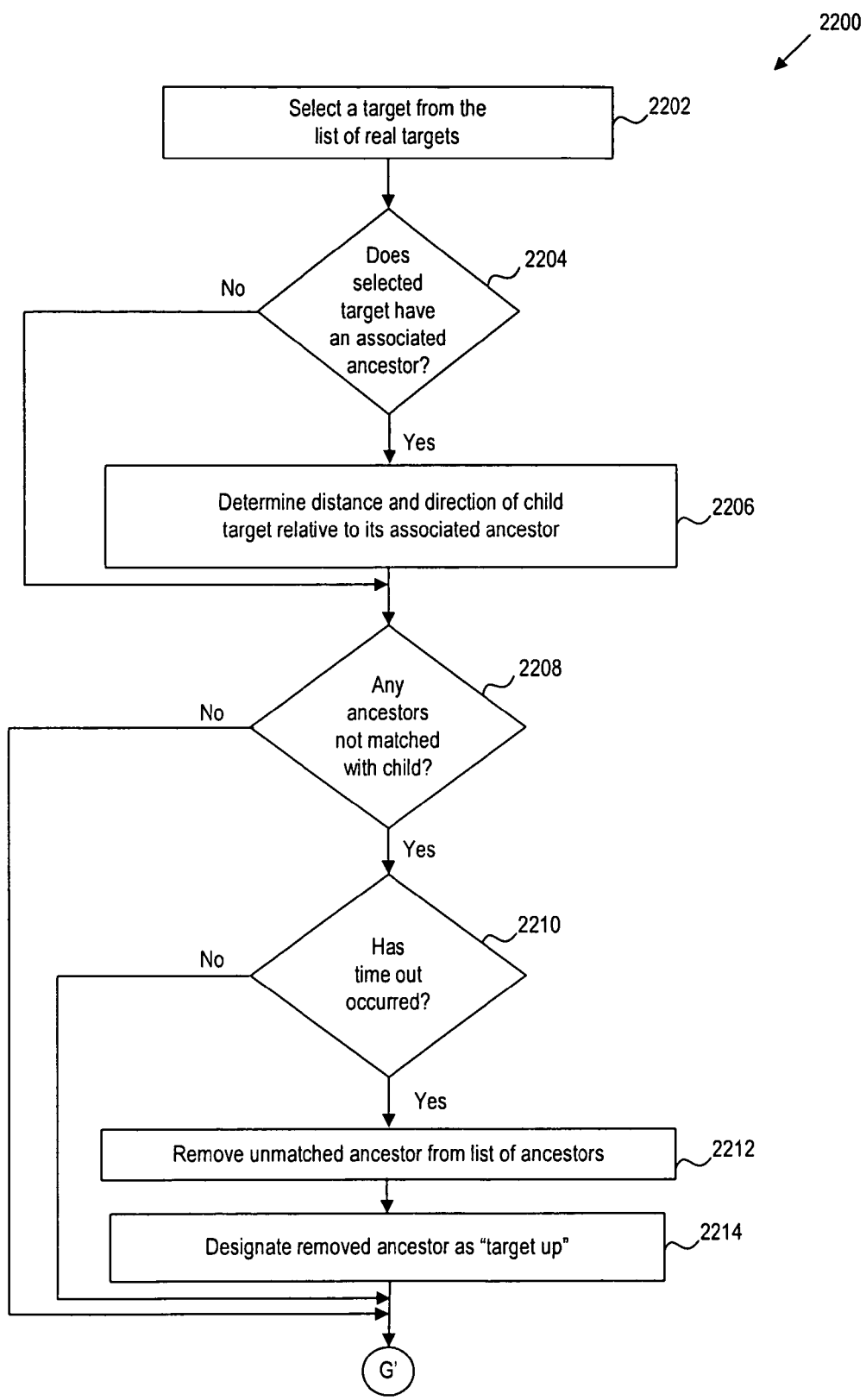
FIG. 22 shows acts which the multi-target state detector may take to narrow the list of possible targets and to determine movement of a target.
Figure 23:
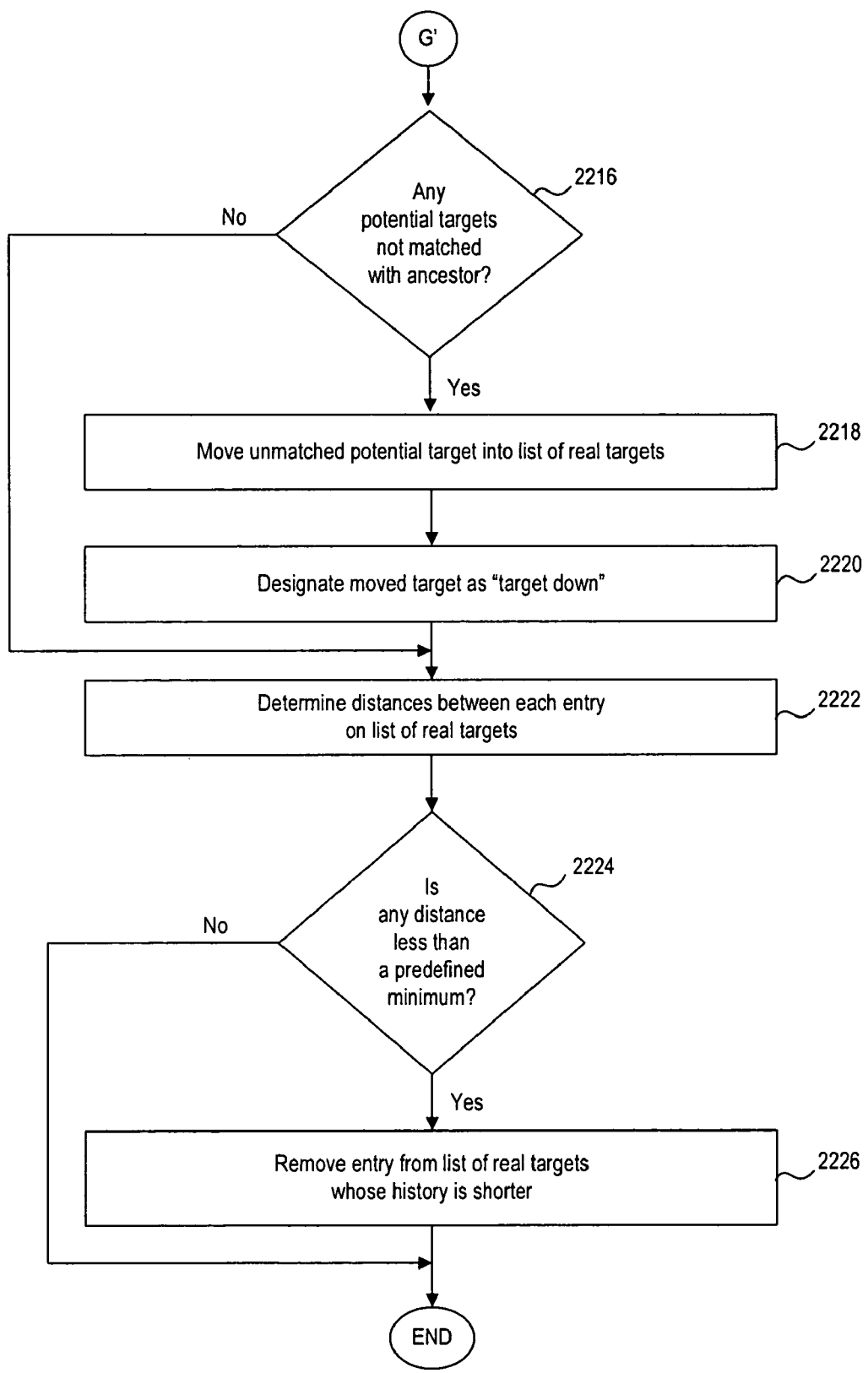
FIG. 23 continues the flow diagram shown in FIG. 22 shows further acts which the multi-target state detector may take to narrow the list of possible targets and to determine movement of a target.

FIGS. 22 and 23 also show acts 2200 the multi-target state detector 1106 may take to analyze potential targets, including potential orphan targets, as well as to analyze movement of the targets. A target is selected from the list of real targets (Act 2202). It is determined whether the selected target has an associated ancestor (Act 2204). If yes, the distance and direction of the child target is determined relative to its associated ancestor (Act 2206). This distance and direction information, as well as other movement information, may be stored for use in future analysis. For example the distance and direction information may be used to determine the expected position of the target in the next frame.

In order to determine whether a target has been removed, such as a user lifting his finger from the screen, it is determined whether any ancestors are not matched with a child (Act 2208). Further, it is determined whether a timeout has occurred (Act 2210). If yes, the ancestor target is removed from the list, (Act 2212) and the removed ancestor is designated as "target up" (Act 2214). Depending on the sampling rate, the timeout may comprise a predetermined expiration period, such as a specific number of milliseconds or specific number of frames. The timeout may be selected such that the target is given a chance to reappear after a very brief pause, such as due to vibration or sensor error. The timeout period may be measured in a predetermined number of frames that the target is no longer registered. For example, the timeout period may include 3 frames (or approximately $3/100$ of a second if the frames run at 100 frames per second) that the target is no longer registered. As another example, the timeout period may include 1 frame.

The multi-target state detector 1106 may determine whether any possible targets on the list of possible targets have not been matched to an ancestor (Act 2216). (Act 2216 is shown in FIG. 23, which continues the flow diagram started in FIG. 22.) This indicates that a new target (i.e., an orphan who does not have an ancestor) has been acquired. For example, the user may have just put his finger on the planar surface 1102. The unmatched possible target is moved into the list of real targets (Act 2218) and designated as "target down" (Act 2220).

Distances are determined between each entry on the list of real targets (Act 2222). If any distance is less than a predetermined minimum (Act 2224), the entry from the list of real targets whose history is shorter is removed (Act 2226). The predetermined distance acts as a measure of the same target moving from frame to frame (such as the same finger moving from one frame to the next). The predetermined minimum may be selected based on the current frame rate of the CCD camera. For example, if the frame rate is low (e.g., 20 frames per second), the amount of time a person may move his/her finger in one frame is greater than a higher frame rate. Therefore, the predetermined minimum (which acts as part of the pruning process) may be larger for cameras that are slower. For a camera that operates at 100 frames per second, the predetermined minimum may be 100 pixels (selected for an approximately 10 foot surface of 4096 pixels).

This sequence removes potentially inadvertent targets close to a more-established target. For example, a user may touch a part of the screen with his finger and inadvertently touch the screen with the cuff of his shirt. To remove or prune these inadvertent targets, a minimum distance between eligible targets is established so that some entries from the list may be pruned. The targets with the longer history, such as those maintaining longer ancestor-child relationships, are preferred to younger ancestor-child relationships. This may implement the heuristic that the firmest and longest-lasting targets on the planar surface 1102 are the one most important to users.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. An application state navigation system for historical navigation of an application, the system comprising:
   multiple output devices arranged to produce a respective output portion of a system output on a display surface, each respective output portion being defined by a designated portion of an overall image;
   multiple application processors, each application processor configured to process one or more respective application programs, each application processor responsive to the designated portion and coupled with an associated respective output device for controlling the associated respective output device in producing the respective output portion;
   a state server in data communication with the plurality of application processors to provide the designated portion of the overall image to the application processors;
   an application history repository comprising a historical state database; and
   a navigation interface system coupled to the application history repository and the state server, the navigation interface system comprising a memory storing an interface input program operable to obtain a temporal selection, a temporal index program operable to obtain retrieved application state data corresponding to the temporal selection from the application history repository, and an output program operable to provide the application state data to the state server for rendering an application representation of an application state corresponding to the temporal selection on the multiple output devices, and wherein:
   the display surface comprises a planar surface;
   at least two cameras are positioned relative to the planar surface to acquire images of multiple simultaneous targets on the planar surface; and
   the memory further comprises logic for receiving data indicative of images of the multiple simultaneous targets, determining potential positions using triangulation, the potential positions comprising positions for the multiple simultaneous targets and positions for targets not associated with a touch on the planar surface, and analyzing the potential positions to determine which, of the potential positions, comprise the positions for the multiple simultaneous targets.

2. The navigation system of claim 1, where the historical state database comprises application state data defining an application state of the application at a predetermined state time, and an application state timestamp representing the predetermined state time.

3. The navigation system of claim 1, where the application history repository further comprises a historical action database comprising action records for multiple operators, the action records comprising application action data defining an action taken on the application at a predetermined action time, an operator identifier which identifies an operator responsible for the action taken, and an application action timestamp representing the predetermined action time, and where:
   the temporal index program is further operable to obtain retrieved application action data from the historical action database; and
   the output program is further operable to provide the retrieved application action data to the state server with the application state data.

4. The navigation system of claim 1, where the application history repository further comprises a historical environment database comprising environment data defining an environment state of the application at a predetermined environment state time, and an application environment timestamp representing the predetermined environment state time, and where:
   the temporal index program is further operable to obtain retrieved environment data from the historical environment database; and
   the output program is further operable to provide the retrieved environment data to the state server with the application state data.

5. The application state navigation system of claim 3, where the retrieved application state data corresponds to an application state time other than the temporal selection, and where the retrieved application action data defines application actions taken between the application state time and the temporal selection.

6. The application state navigation system of claim 4, where the retrieved environment data comprises audio information, video information, or both, captured locally with respect to the output devices during development of the application.

7. The application state navigation system of claim 6 further comprising:
   input detectors positioned to detect an operator activation and produce an operator activation signal in response thereto; and
   an input processor in data communication with the input detectors and the state server to convey information about the operator activation signal for processing by the state server.

8. The application state navigation system of claim 7, where the retrieved environment data comprises audio information, video information, or both, captured remotely with respect to the output devices during development of the application.

9. The system of claim 1, wherein a target is registered as an occlusion in the image acquired by the cameras; and
   wherein the logic for determining the potential positions using triangulation comprises logic for selecting one of the at least two cameras and iterating the following logic for each occlusion for the selected camera:
   determining a ray corresponding to the occlusion for the selected camera;
   determining rays corresponding to the occlusions for an unselected camera; and
   triangulating the ray corresponding to the occlusion for the selected camera and the rays corresponding to the occlusions for the unselected camera to determine the potential positions.

* * * * *